United States Patent
Cheng et al.

(10) Patent No.: US 11,283,564 B2
(45) Date of Patent: Mar. 22, 2022

(54) METHOD FOR TRANSMITTING AND RECEIVING INFORMATION, USER EQUIPMENT, AND BASE STATION

(71) Applicant: Huawei Technologies Co., Ltd., Guangdong (CN)

(72) Inventors: Yan Cheng, Beijing (CN); Lixia Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 148 days.

(21) Appl. No.: 16/185,916

(22) Filed: Nov. 9, 2018

(65) Prior Publication Data

US 2019/0081754 A1 Mar. 14, 2019

Related U.S. Application Data

(63) Continuation of application No. PCT/CN2017/083229, filed on May 5, 2017.

(30) Foreign Application Priority Data

May 11, 2016 (CN) .......................... 201610309302.6

(51) Int. Cl.
  *H04L 5/00* (2006.01)
  *H04L 5/14* (2006.01)
  *H04L 1/18* (2006.01)

(52) U.S. Cl.
  CPC .......... *H04L 5/0048* (2013.01); *H04L 1/1812* (2013.01); *H04L 5/0051* (2013.01); *H04L 5/14* (2013.01); *H04L 5/1469* (2013.01)

(58) Field of Classification Search
  None
  See application file for complete search history.

(56) References Cited

U.S. PATENT DOCUMENTS

2014/0241310 A1   8/2014  Guan et al.
2014/0328283 A1  11/2014  Wan et al.
2015/0078281 A1   3/2015  Kishiyama et al.
(Continued)

FOREIGN PATENT DOCUMENTS

CN    103095637 A   5/2013
CN    103096493 A   5/2013
(Continued)

OTHER PUBLICATIONS

"System Analysis on TTI Shortening," 3GPP TSG RAN WG1 #83, Anaheim, CA, USA, R1-156613, pp. 1-8, 3rd Generation Partnership Project, Valbonne, France (Nov. 15-22, 2015).
(Continued)

*Primary Examiner* — Kodzovi Acolatse
(74) *Attorney, Agent, or Firm* — Leydig, Voit & Mayer, Ltd.

(57) ABSTRACT

Embodiments of the present disclosure disclose a method for transmitting and receiving information, user equipment, and a base station to better support dynamic TDD and keep forward compatibility. A method in an embodiment of the present disclosure includes: determining, by a first device, a location of a reference signal; and transmitting or receiving, by the first device, the reference signal based on the determined location of the reference signal.

14 Claims, 7 Drawing Sheets

(56) References Cited

U.S. PATENT DOCUMENTS

| | | | |
|---|---|---|---|
| 2015/0263839 A1 | 9/2015 | He et al. | |
| 2016/0020882 A1 | 1/2016 | Shimezawa et al. | |
| 2016/0254869 A1* | 9/2016 | Wen | H04L 27/265 370/330 |
| 2017/0086175 A1* | 3/2017 | Yasukawa | H04W 72/0453 |
| 2017/0127396 A1* | 5/2017 | Luo | H04B 7/0452 |
| 2017/0170944 A1* | 6/2017 | Ang | H04W 72/042 |
| 2017/0171850 A1* | 6/2017 | Ang | H04W 72/0406 |
| 2017/0222696 A1* | 8/2017 | Ji | H04L 25/0224 |

FOREIGN PATENT DOCUMENTS

| | | |
|---|---|---|
| CN | 102237926 B | 3/2014 |
| CN | 103650611 A | 3/2014 |
| CN | 103944665 A | 7/2014 |
| CN | 104221427 A | 12/2014 |
| CN | 104285405 A | 1/2015 |
| EP | 2833670 A1 | 2/2015 |
| EP | 3408964 A1 | 12/2018 |
| JP | 2011077647 A | 4/2011 |
| JP | 2013219501 A | 10/2013 |
| JP | 2015510317 A | 4/2015 |
| KR | 20140116497 A | 10/2014 |
| WO | 2014148318 A1 | 9/2014 |
| WO | 2014186960 A1 | 11/2014 |
| WO | 2016029958 A1 | 3/2016 |
| WO | 2017132070 A1 | 8/2017 |

OTHER PUBLICATIONS

"Overview of TTI shortening," 3GPP TSG RAN WG1 Meeting #84, St Julian's, Malta, R1-160596, pp. 1-3, 3rd Generation Partnership Project, Valbonne, France (Feb. 15-19, 2016).

Levanen et al., "Dense small-cell networks: Rethinking the radiointerface beyond LTE-advanced," 2014 1st International Conference on 5G for Ubiquitous Connectivity (5GU), XP032735039, pp. 1-826 Nov. 2014, total 8 pages., Broadcom Corporated, Finland (Nov. 28-28, 2014).

Levanen et al., "Dense small-cell networks: Rethinking the radio interface beyond LTE-advanced," 2014 1st International Conference on 5G for Ubiquitous Connectivity (5GU), XP032735039, total 8 pages., Broadcom Corporated, Finland (Nov. 26, 2014).

* cited by examiner

METHOD FOR TRANSMITTING AND RECEIVING INFORMATION, USER EQUIPMENT, AND BASE STATION

CROSS-REFERENCE TO RELATED APPLICATIONS

This application is a continuation of International Application No. PCT/CN2017/083229, filed on May 5, 2017, which claims priority to Chinese Patent Application No. 201610309302.6, filed on May 11, 2016. The disclosures of the aforementioned applications are hereby incorporated by reference in their entireties.

TECHNICAL FIELD

Embodiments of the present disclosure relate to the field of communications technologies, and in particular, to a method for transmitting and receiving information, user equipment, and a base station.

BACKGROUND

A 5th generation mobile communications technology (5G) communications system is dedicated to supporting higher system performance. The 5G communications system supports different services, different deployment scenarios, and different spectrums. The different services include enhanced mobile broadband (eMBB), machine type communication (MTC), ultra-reliable and low latency communications (URLLC), a multimedia broadcast multicast service (MBMS), positioning, and the like. The different deployment scenarios include indoor hotspot, dense urban, suburban, urban macro coverage, and high-speed railway scenarios, and the like. 5G supports a spectrum range of up to 100 GHz. Dynamic time division duplex (TDD) is an important technology in the 5G communications system. Dynamic TDD better matches a real-time service requirement by dynamically adjusting a transmission direction of a subframe, to improve spectrum efficiency of the communications system and better satisfy a requirement of a low latency service. A 5G communications system design needs to enable better application of dynamic TDD. The 5G communications system needs to support forward compatibility. To be specific, the 5G communications system can flexibly allow introduction of unknown features in the future, and user equipment supporting only the design of existing 5G communications system can still work under the system with the unknown features. The 5G communications system design needs to support forward compatibility.

Because research of the 5G communications system has just begun, a method for designing a channel and a signal, which can enable better supporting dynamic TDD and keeping forward compatibility under 5G communications system, is currently not provided in the prior art.

SUMMARY

Embodiments of the present disclosure provide a method for transmitting and receiving information, user equipment, and a base station to better support dynamic TDD and keep forward compatibility.

In view of this, a first aspect of the present disclosure provides a method for transmitting and receiving information, where the method includes:

determining, by a first device, a location of a reference signal; and transmitting or receiving, by the first device, the reference signal based on the determined location of the reference signal.

Herein the first device may be user equipment, or may be a base station. The reference signal may include a first reference signal and a second reference signal, where the first reference signal may be referred to as a first demodulation reference signal (DMRS), and the second reference signal may be referred to as a second demodulation reference signal (DMRS). The first reference signal may be used for uplink data demodulation, and the second reference signal may be used for downlink data demodulation. A location (time domain location and/or frequency domain location) of the first reference signal may be the same as a location (time domain location and/or frequency domain location) of the second reference signal.

In addition, if the location (time domain location and/or frequency domain location) of the first reference signal is the same as the location (time domain location and/or frequency domain location) of the second reference signal, the first device can better perform uplink-downlink interference estimation by using the first reference signal and the second reference signal, and therefore better perform uplink-downlink interference cancellation, so as to better use TDD, better match an actual service, improve spectrum efficiency of a system, and better provide a low latency service.

In some possible implementations, the reference signal includes a first reference signal and a second reference signal, and the determining, by a first device, a location of a reference signal includes: determining, by the first device, a location of the first reference signal, where the first reference signal is used for downlink data demodulation; and determining, by the first device, a location of the second reference signal, where the second reference signal is used for uplink data demodulation.

Optionally, the first device receives the first reference signal based on the location of the first reference signal, and transmits the second reference signal based on the location of the second reference signal; or the first device transmits the first reference signal based on the location of the first reference signal, and receives the second reference signal based on the location of the second reference signal.

A time domain location of the first reference signal is the same as a time domain location of the second reference signal.

In addition, based on the determined location of the first reference signal and location of the second reference signal, the first device transmits the first reference signal and receives the second reference signal, or receives the first reference signal and transmits the second reference signal.

In other possible implementations, a frequency domain location of the first reference signal is the same as a frequency domain location of the second reference signal.

In other possible implementations, the first reference signal is carried in a first transmission unit, the location of the first reference signal is a location of the first reference signal in the first transmission unit, the second reference signal is carried in a second transmission unit, the location of the second reference signal is a location of the second reference signal in the second transmission unit, that a time domain location of the first reference signal is the same as a time domain location of the second reference signal is specifically that a time domain location of the first reference signal in the first transmission unit is the same as a time domain location of the second reference signal in the second transmission unit, and duration corresponding to the first transmission unit is equal to duration corresponding to the second transmission unit.

In addition, because a transmission direction of a transmission unit may dynamically change in a dynamic TDD mechanism, that is, the transmission unit may be dynamically applied to uplink data transmission or downlink data transmission, a current service requirement can be matched better.

In other possible implementations, the first reference signal is carried in a first transmission unit, the location of the first reference signal is a location of the first reference signal in the first transmission unit, the second reference signal is carried in a second transmission unit, the location of the second reference signal is a location of the second reference signal in the second transmission unit, that a time domain location of the first reference signal is the same as a time domain location of the second reference signal is that a time domain location of the first reference signal in the first transmission unit is the same as a time domain location of the second reference signal in the second transmission unit, that a frequency domain location of the first reference signal is the same as a frequency domain location of the second reference signal is that a frequency domain location of the first reference signal in the first transmission unit is the same as a frequency domain location of the second reference signal in the second transmission unit, and duration corresponding to the first transmission unit is equal to duration corresponding to the second transmission unit.

In addition, because a transmission direction of a subframe may dynamically change in a dynamic TDD mechanism, that is, the subframe may be dynamically applied to uplink data transmission or downlink data transmission, a current service requirement can be matched better.

In other possible implementations, the first reference signal is located on a third symbol in the first transmission unit, and the second reference signal is located on a third symbol in the second transmission unit.

In the present disclosure, the symbol may be a time domain symbol, for example, may be a single-carrier frequency division multiple access (SC-FDMA) symbol, or may be an orthogonal frequency division multiplexing (OFDM) symbol.

In other possible implementations, the first reference signal is carried in a first subframe, the location of the first reference signal is a location of the first reference signal in the first subframe, the second reference signal is carried in a second subframe, the location of the second reference signal is a location of the second reference signal in the second subframe, that a time domain location of the first reference signal is the same as a time domain location of the second reference signal is that a time domain location of the first reference signal in the first subframe is the same as a time domain location of the second reference signal in the second subframe, a quantity of symbols used for downlink transmission in the first subframe is greater than a quantity of symbols used for uplink transmission in the first subframe, and a quantity of symbols used for downlink transmission in the second subframe is less than a quantity of symbols used for uplink transmission in the second subframe.

In other possible implementations, the first reference signal is carried in a first subframe, the location of the first reference signal is a location of the first reference signal in the first subframe, the second reference signal is carried in a second subframe, the location of the second reference signal is a location of the second reference signal in the second subframe, that a time domain location of the first reference signal is the same as a time domain location of the second reference signal is that a time domain location of the first reference signal in the first subframe is the same as a time domain location of the second reference signal in the second subframe, that a frequency domain location of the first reference signal is the same as a frequency domain location of the second reference signal is that a frequency domain location of the first reference signal in the first subframe is the same as a frequency domain location of the second reference signal in the second subframe, a quantity of symbols used for downlink transmission in the first subframe is greater than a quantity of symbols used for uplink transmission in the first subframe, and a quantity of symbols used for downlink transmission in the second subframe is less than a quantity of symbols used for uplink transmission in the second subframe.

In other possible implementations, the first subframe includes a symbol used for downlink transmission, a guard period (GP), and a symbol used for uplink transmission, uplink transmission corresponding to a symbol included in the first subframe and used for uplink transmission includes hybrid automatic repeat request-acknowledgment (HARQ-ACK) transmission, and downlink transmission corresponding to a symbol included in the first subframe and used for downlink transmission includes downlink control transmission, downlink data transmission, and transmission of the first reference signal; and the second subframe includes a symbol used for downlink transmission, a guard period (GP), and a symbol used for uplink transmission, downlink transmission corresponding to a symbol included in the second subframe and used for downlink transmission includes downlink control transmission, and uplink transmission corresponding to a symbol included in the second subframe and used for uplink transmission includes uplink control transmission, uplink data transmission, and transmission of the second reference signal.

In other possible implementations, the first subframe starts with a symbol included in the first subframe and used for downlink transmission, and ends with a symbol included in the first subframe and used for uplink transmission; and the second subframe starts with a symbol included in the second subframe and used for downlink transmission, and ends with a symbol included in the second subframe and used for uplink transmission.

In other possible implementations, that a time domain location of the first reference signal in the first subframe is the same as a time domain location of the second reference signal in the second subframe is specifically that an index of a symbol occupied by the first reference signal in the first subframe is the same as an index of a symbol occupied by the second reference signal in the second subframe.

In other possible implementations, the first reference signal is located on a third symbol in the first subframe, and the second reference signal is located on a third symbol in the second subframe.

In other possible implementations, the first device is user equipment, and the transmitting or receiving, by the first device, the reference signal based on the determined location of the reference signal includes: receiving, by the user equipment, the first reference signal based on the location of the first reference signal; and transmitting, by the user equipment, the second reference signal based on the location of the second reference signal.

In other possible implementations, the first device is a base station, and the transmitting or receiving, by the first device, the reference signal based on the determined location of the reference signal includes:

transmitting, by the base station, the first reference signal based on the location of the first reference signal; and receiving, by the base station, the second reference signal based on the location of the second reference signal.

A second aspect of the present disclosure provides a method for receiving information, where the method includes:

determining, by user equipment, a time-frequency resource of a control channel; and receiving, by the user equipment, downlink control information based on the time-frequency resource of the control channel.

In some possible implementations, the determining, by user equipment, a time-frequency resource of a control channel, and the receiving, by the user equipment, downlink control information based on the time-frequency resource of the control channel include: determining, by the user equipment, a time-frequency resource of a first control channel; determining, by the user equipment, a time-frequency resource of a second control channel; detecting, by the user equipment, first downlink control information based on the time-frequency resource of the first control channel; and detecting, by the user equipment, second downlink control information based on the time-frequency resource of the second control channel.

In other possible implementations, a symbol occupied by the time-frequency resource of the first control channel is located before a symbol occupied by the time-frequency resource of the second control channel.

In other possible implementations, the time-frequency resource of the first control channel occupies i symbols, corresponding to symbols $l_0, \ldots, l_{i-1}$, where i is a positive integer greater than or equal to 1; the time-frequency resource of the second control channel starts with a symbol $l_{i+k}$, where k is a positive integer greater than or equal to 1; and a symbol $l_i$ to a symbol $l_{i+k-1}$ are used to transmit a reference signal, where the reference signal is used to demodulate the second control channel and/or data.

In other possible implementations, the time-frequency resource of the first control channel occupies i symbols, corresponding to symbols $l_0, \ldots, l_{i-1}$, where i is a positive integer greater than or equal to 1; the time-frequency resource of the second control channel starts with a symbol $l_i$, or the time-frequency resource of the second control channel is located on a symbol after the symbol $l_{i-1}$; and the second control channel and downlink data are multiplexed on a time-frequency resource corresponding to the symbol after the symbol $l_{i-1}$.

In other possible implementations, the determining, by the user equipment, a time-frequency resource of a first control channel, and the determining, by the user equipment, a time-frequency resource of a second control channel include: determining, by the user equipment, a time-frequency resource of the first control channel in a first subframe; and determining, by the user equipment, a time-frequency resource of the second control channel in the first subframe; where the first subframe includes a symbol used for downlink transmission, a guard period (GP), and a symbol used for uplink transmission, uplink transmission corresponding to a symbol included in the first subframe and used for uplink transmission includes hybrid automatic repeat request-acknowledgment (HARQ-ACK) transmission, and downlink transmission corresponding to a symbol included in the first subframe and used for downlink transmission includes downlink control transmission, downlink data transmission, and transmission of a first reference signal; and symbols included in the first subframe and used for downlink transmission include a symbol occupied by the time-frequency resource of the first control channel and a symbol occupied by the time-frequency resource of the second control channel.

In other possible implementations, the time-frequency resource of the first control channel occupies i symbols in the first subframe, corresponding to a first symbol to an $i^{th}$ symbol in the first subframe, where i is a positive integer greater than or equal to 1; the time-frequency resource of the second control channel starts with an $(i+k+1)^{th}$ symbol in the first subframe, where k is a positive integer greater than or equal to 1; an $(i+1)^{th}$ symbol to an $(i+k)^{th}$ symbol in the first subframe are used to transmit a reference signal, where the reference signal is used to demodulate the second control channel and/or data; and an $(l-k1)^{th}$ symbol to an $l^{th}$ symbol in the first subframe are symbols used for uplink transmission in the first subframe, where l is a quantity of symbols included in the first subframe, and k1 is a positive integer greater than or equal to 1.

In other possible implementations, the time-frequency resource of the first control channel occupies i symbols in the first subframe, corresponding to a first symbol to an $i^{th}$ symbol in the first subframe, where i is a positive integer greater than or equal to 1; the time-frequency resource of the second control channel starts with an $(i+1)^{th}$ symbol in the first subframe, or the time-frequency resource of the second control channel is located on a symbol after the $i^{th}$ symbol in the first subframe; the second control channel and downlink data are multiplexed on time-frequency resources corresponding to the $i^{th}$ symbol in the first subframe to an $(i+k2)^{th}$ symbol in the first subframe, where k2 is a positive integer greater than 1; an $(i+k2+1)^{th}$ symbol in the first subframe is a guard period (GP) in the first subframe; and an $(i+k2+2)^{th}$ symbol to an $l^{th}$ symbol in the first subframe are symbols used for uplink transmission in the first subframe, where l is a quantity of symbols included in the first subframe.

In other possible implementations, the determining, by the user equipment, a time-frequency resource of a first control channel, and the determining, by the user equipment, a time-frequency resource of a second control channel include:

determining, by the user equipment, a time-frequency resource of the first control channel in a second subframe; and determining, by the user equipment, that no time-frequency resource of the second control channel exists in the second subframe; where the second subframe includes a symbol used for downlink transmission, a guard period (GP), and a symbol used for uplink transmission, downlink transmission corresponding to a symbol included in the second subframe and used for downlink transmission includes downlink control transmission, and uplink transmission corresponding to a symbol included in the second subframe and used for uplink transmission includes transmission of the second reference signal, uplink data transmission, and uplink control transmission.

In other possible implementations, a symbol included in the second subframe and used for downlink transmission is a first symbol in the second subframe, and the time-frequency resource of the first control channel occupies the first symbol in the second subframe.

In other possible implementations, the determining, by the user equipment, a time-frequency resource of a second control channel includes: determining, by the user equipment, the time-frequency resource of the second control channel according to the first downlink control information.

In other possible implementations, the first downlink control information is carried in a subframe n, and the second control channel is carried in the subframe n; or the first downlink control information is carried in a subframe n, and the second control channel is carried in a subframe n+1; where n is a positive integer.

In other possible implementations, the method further includes: receiving, by the user equipment, a downlink shared channel according to the first downlink control information and the second downlink control information; where the first downlink control information includes information about the time-frequency resource of the second downlink control channel and/or information about a time-frequency resource of the downlink shared channel; and the second downlink control information includes modulation and coding information of the downlink shared channel.

In other possible implementations, the first control channel is demodulated according to a reference signal carried on the time-frequency resource of the first control channel.

In other possible implementations, the determining, by user equipment, a time-frequency resource of a control channel includes: determining, by the user equipment, a time-frequency resource of the control channel in a subframe n; and if the subframe n belongs to a subframe set 1, determining, by the user equipment, the time-frequency resource of the control channel in the subframe n according to a preset rule; or if the subframe n belongs to a subframe set 2, determining, by the user equipment, the time-frequency resource of the control channel in the subframe n according to downlink control signaling; where the subframe set 1 includes a subframe carrying a synchronization signal and/or system information, and the subframe set 2 does not include a subframe carrying a synchronization signal and/or system information; and n is an integer greater than or equal to 0.

In other possible implementations, the determining, by the user equipment, the time-frequency resource of the control channel in the subframe n according to downlink control signaling includes: determining, by the user equipment, the time-frequency resource of the control channel in the subframe n according to downlink control signaling carried in a subframe n−k, where k is an integer greater than or equal to 0.

For example, if a value of k is equal to 1, the user equipment determines the time-frequency resource of the control channel in the subframe n according to downlink control signaling carried in a subframe n−1. It should be noted that, the subframe n−k may represent a $k^{th}$ subframe, counting from the subframe n forward, where the subframe n−k and the subframe n may be in a same radio frame or may not be in a same radio frame. When they are not in a same radio frame, the subframe n−k and the subframe n are in two adjacent radio frames. Herein the downlink control signaling may be downlink control information, or information carried in a downlink control information format.

In other possible implementations, the determining, by the user equipment, the time-frequency resource of the control channel in the subframe n according to downlink control signaling includes: determining, by the user equipment, the time-frequency resource of the control channel in the subframe n according to downlink control signaling carried in a subframe n−1.

In other possible implementations, the time-frequency resource of the control channel in the subframe n occupies two symbols in time domain.

In other possible implementations, the control channel includes a control channel set 1, and the determining, by user equipment, a time-frequency resource of a control channel includes: determining, by the user equipment, a time-frequency resource of the control channel set 1; where the control channel in the control channel set 1 uses a distributed transmission mode.

Herein that the control channel uses a distributed transmission mode may mean that a time-frequency resource occupied by the control channel that is transmitted on the time-frequency resource of the control channel and carries a downlink control information (DCI) format is distributed across the time-frequency resource of the control channel. For example, specifically, resource element groups (REG) corresponding to a control channel carrying a downlink control information (DCI) format are distributed across the time-frequency resource of the control channel. Because the control channel is transmitted in distributed mode, more diversity gains can be obtained, and performance of the control channel is improved.

In other possible implementations, the control channel includes a control channel set 1 and a control channel set 2, and the determining, by user equipment, a time-frequency resource of a control channel includes: determining, by the user equipment, a time-frequency resource of the control channel set 1; and determining, by the user equipment, a time-frequency resource of the control channel set 2; where the control channel in the control channel set 1 uses a distributed transmission mode, and the control channel in the control channel set 2 uses a localized transmission mode.

Herein that the control channel uses a localized transmission mode may mean that a time-frequency resource occupied by the control channel that is transmitted on the time-frequency resource of the control channel and carries a downlink control information (DCI) format is localized on the time-frequency resource of the control channel. For example, specifically, resource element groups (REG) corresponding to a control channel carrying a downlink control information (DCI) format are localized on a part of the time-frequency resource of the control channel. Because the control channel is transmitted in localized mode, a beamforming transmission mode can be used, the control channel concentrates on a corresponding beam direction, and coverage of the control channel is improved. In addition, in localized transmission, a user can combine reference signals on localized resources to perform channel estimation, so that performance of channel estimation is improved, and performance of the control channel based on a beam transmission mode is improved.

In other possible implementations, the determining, by the user equipment, a time-frequency resource of the control channel set 1 includes: detecting, by the user equipment, downlink control information in a subframe n; and determining, by the user equipment, a time-frequency resource of the control channel set 1 in a subframe n+k according to the downlink control information detected in the subframe n, where n is an integer, and k is a positive integer greater than or equal to 1. In other possible implementations, the method further includes: determining, by the user equipment, a time-frequency resource of the control channel set 2 in the subframe n+k based on the time-frequency resource of the control channel set 1 in the subframe n+k.

In other possible implementations, a subframe carrying the control channel does not carry a synchronization signal and/or system information.

In other possible implementations, the determining, by user equipment, a time-frequency resource of a control channel includes: determining, by the user equipment, a time-frequency resource of a basic set of the control channel; detecting, by the user equipment, the downlink control information based on the time-frequency resource of the basic set; and determining, by the user equipment, a time-frequency resource of an extended set of the control channel according to the detected downlink control information.

In other possible implementations, the determining, by the user equipment, a time-frequency resource of a basic set of the control channel includes: receiving, by the user equipment, system information; and determining, by the user equipment, the time-frequency resource of the basic set of the control channel according to the system information.

In other possible implementations, the determining, by the user equipment, the time-frequency resource of the basic set of the control channel according to the system information includes: determining, by the user equipment according to the system information, a quantity of symbols occupied by the time-frequency resource of the basic set of the control channel; or determining, by the user equipment according to the system information, a quantity of physical resource blocks occupied by the time-frequency resource of the basic set of the control channel; or determining, by the user equipment according to the system information, a quantity of control channel elements (CCE) corresponding to the time-frequency resource of the basic set of the control channel.

In other possible implementations, the determining, by the user equipment, a time-frequency resource of a basic set of the control channel includes: determining, by the user equipment, the time-frequency resource of the basic set of the control channel according to a preset rule.

In other possible implementations, the preset rule is that the time-frequency resource of the basic set of the control channel occupies one symbol.

In other possible implementations, the determining, by the user equipment, a time-frequency resource of a basic set of the control channel includes: receiving, by the user equipment, system information; determining, by the user equipment according to the system information, a quantity of physical resource blocks occupied by the time-frequency resource of the basic set of the control channel or a quantity of control channel elements corresponding to the time-frequency resource of the basic set of the control channel; and determining, by the user equipment according to a predefined rule, a quantity of symbols occupied by the time-frequency resource of the control channel, where the predefined rule may be that the quantity of the symbols occupied by the time-frequency resource of the control channel is a fixed value, or that the quantity of the symbols occupied by the time-frequency resource of the control channel is a preset value, for example, 2 symbols.

In other possible implementations, the detecting, by the user equipment, the downlink control information based on the time-frequency resource of the basic set, and the determining, by the user equipment, a time-frequency resource of an extended set of the control channel according to the detected downlink control information include: detecting, by the user equipment, the downlink control information based on the time-frequency resource of the basic set in a subframe n; and determining, by the user equipment, a time-frequency resource of the extended set of the control channel in a subframe n+k according to the downlink control information detected in the subframe n, where n is an integer, and k is a positive integer greater than or equal to 0. Optionally, a value of k is equal to 1.

In other possible implementations, the method further includes: determining, by the user equipment according to the detected downlink control information, whether the extended set of the control channel exists; or determining, by the user equipment according to the detected downlink control information, a transmission mode corresponding to the extended set of the control channel.

In other possible implementations, the basic set exists in all subframes including symbols used for downlink transmission.

In other possible implementations, the extended set does not exist in a subframe carrying a synchronization signal and/or system information.

A third aspect of the present disclosure provides a method for transmitting information, where the method includes:
determining, by a base station, a time-frequency resource of a control channel; and
transmitting, by the base station, downlink control information based on the time-frequency resource of the control channel.

In some possible implementations, the determining, by a base station, a time-frequency resource of a control channel, and the transmitting, by the base station, downlink control information based on the time-frequency resource of the control channel include: determining, by the base station, a time-frequency resource of a first control channel; determining, by the base station, a time-frequency resource of a second control channel; transmitting, by the base station, first downlink control information based on the time-frequency resource of the first control channel; and transmitting, by the base station, second downlink control information based on the time-frequency resource of the second control channel.

In other possible implementations, a symbol occupied by the time-frequency resource of the first control channel is located before a symbol occupied by the time-frequency resource of the second control channel.

In other possible implementations, the time-frequency resource of the first control channel occupies i symbols, corresponding to symbols $l_0, \ldots, l_{i-1}$, where i is a positive integer greater than or equal to 1; the time-frequency resource of the second control channel starts with a symbol $l_{i+k}$, where k is a positive integer greater than or equal to 1; and a symbol $l_i$ to a symbol $l_{i+k-1}$ are used to transmit a reference signal, where the reference signal is used to demodulate the second control channel and/or data.

In other possible implementations, the time-frequency resource of the first control channel occupies i symbols, corresponding to symbols $l_0, \ldots, l_{i-1}$, where i is a positive integer greater than or equal to 1; the time-frequency resource of the second control channel starts with a symbol $l_{i+k}$, or the time-frequency resource of the second control channel is located on a symbol after the symbol $l_{i-1}$; and the second control channel and downlink data are multiplexed on a time-frequency resource corresponding to the symbol after the symbol $l_{i-1}$.

In other possible implementations, the determining, by the base station, a time-frequency resource of a first control channel, and determining, by the base station, a time-frequency resource of a second control channel the include: determining, by the base station, a time-frequency resource of the first control channel in a first subframe; and determining, by the base station, a time-frequency resource of the second control channel in the first subframe; where the first subframe includes a symbol used for downlink transmission, a guard period (GP), and a symbol used for uplink transmission, uplink transmission corresponding to a symbol included in the first subframe and used for uplink transmission includes hybrid automatic repeat request-acknowledgment (HARQ-ACK) transmission, and downlink transmission corresponding to a symbol included in the first subframe and used for downlink transmission includes downlink control transmission, downlink data transmission, and transmission of a first reference signal; and symbols included in the first subframe and used for downlink transmission include a symbol occupied by the time-frequency resource of the first control channel and a symbol occupied by the time-frequency resource of the second control channel.

In other possible implementations, the time-frequency resource of the first control channel occupies i symbols in the first subframe, corresponding to a first symbol to an $i^{th}$ symbol in the first subframe, where i is a positive integer greater than or equal to 1; the time-frequency resource of the second control channel starts with an $(i+k+1)^{th}$ symbol in the first subframe, where k is a positive integer greater than or equal to 1; an $(i+1)^{th}$ symbol to an $(i+k)^{th}$ symbol in the first subframe are used to transmit a reference signal, where the reference signal is used to demodulate the second control channel and/or data; and an $(l-k1)^{th}$ symbol to an $l^{th}$ symbol in the first subframe are symbols used for uplink transmission in the first subframe, where l is a quantity of symbols included in the first subframe, and k1 is a positive integer greater than or equal to 1.

In other possible implementations, the time-frequency resource of the first control channel occupies i symbols in the first subframe, corresponding to a first symbol to an $i^{th}$ symbol in the first subframe, where i is a positive integer greater than or equal to 1; the time-frequency resource of the second control channel starts with an $(i+1)^{th}$ symbol in the first subframe, or the time-frequency resource of the second control channel is located on a symbol after the $i^{th}$ symbol in the first subframe; the second control channel and downlink data are multiplexed on time-frequency resources corresponding to the $i^{th}$ symbol in the first subframe to an $(i+k2)^{th}$ symbol in the first subframe, where k2 is a positive integer greater than 1; an $(i+k2+1)^{th}$ symbol in the first subframe is a guard period (GP) in the first subframe; and an $(i+k2+2)^{th}$ symbol to an $l^{th}$ symbol in the first subframe are symbols used for uplink transmission in the first subframe, where l is a quantity of symbols included in the first subframe.

In other possible implementations, the determining, by the base station, a time-frequency resource of a first control channel, and determining, by the base station, a time-frequency resource of a second control channel the include: determining, by the base station, a time-frequency resource of the first control channel in a second subframe; and determining, by the base station, that no time-frequency resource of the second control channel exists in the second subframe; where the second subframe includes a symbol used for downlink transmission, a guard period (GP), and a symbol used for uplink transmission, downlink transmission corresponding to a symbol included in the second subframe and used for downlink transmission includes downlink control transmission, and uplink transmission corresponding to a symbol included in the second subframe and used for uplink transmission includes transmission of the second reference signal, uplink data transmission, and uplink control transmission.

In other possible implementations, a symbol included in the second subframe and used for downlink transmission is a first symbol in the second subframe, and the time-frequency resource of the first control channel occupies the first symbol in the second subframe.

In other possible implementations, the first downlink control information includes information about the time-frequency resource of the second control channel.

In other possible implementations, the first downlink control information is carried in a subframe n, and the second control channel is carried in the subframe n; or the first downlink control information is carried in a subframe n, and the second control channel is carried in a subframe n+1; where n is a positive integer.

In other possible implementations, the method further includes: transmitting, by the base station, a downlink shared channel; where the first downlink control information includes the information about the time-frequency resource of the second downlink control channel and/or information about a time-frequency resource of the downlink shared channel; and the second downlink control information includes modulation and coding information of the downlink shared channel.

In other possible implementations, the method further includes: transmitting, by the base station, a reference signal on the time-frequency resource of the first control channel, where the reference signal is used to demodulate the first control channel.

In other possible implementations, the method further includes: transmitting, by the base station, downlink control signaling, where the downlink control signaling is used to determine a time-frequency resource of the control channel in a subframe n, the subframe n does not carry a synchronization signal and/or system information, and n is an integer greater than or equal to 0.

In other possible implementations, the transmitting, by the base station, downlink control signaling includes: transmitting, by the base station, the downlink control signaling in a subframe n–k, where k is an integer greater than or equal to 0. Optionally, k is equal to 1.

In other possible implementations, the determining, by a base station, a time-frequency resource of a control channel includes: determining, by the base station, a time-frequency resource of the control channel in a subframe n according to a predefined rule, where the subframe n carries a synchronization signal and/or system information. The predefined rule may be that a quantity of symbols occupied by the time-frequency resource of the control channel is a fixed value, or that a quantity of symbols occupied by the time-frequency resource of the control channel is a preset value, for example, 2 symbols.

In other possible implementations, the control channel includes a control channel set 1, and the determining, by a base station, a time-frequency resource of a control channel includes: determining, by the base station, a time-frequency resource of the control channel set 1; and the method further includes: transmitting, by the base station, the control channel based on the time-frequency resource of the control channel set 1 by using a distributed transmission mode.

In other possible implementations, the control channel includes a control channel set 1 and a control channel set 2, and the determining, by a base station, a time-frequency resource of a control channel includes: determining, by the base station, a time-frequency resource of the control channel set 1; and determining, by the base station, a time-frequency resource of the control channel set 2; where the control channel in the control channel set 1 uses a distributed transmission mode, and the control channel in the control channel set 2 uses a localized transmission mode.

In other possible implementations, the method further includes: transmitting, by the base station, downlink control information in a subframe n, where the downlink control information includes information about a time-frequency resource of the control channel set 1 in a subframe n+k, n is an integer, and k is a positive integer greater than or equal to 1.

In other possible implementations, the determining, by a base station, a time-frequency resource of a control channel, and the transmitting, by the base station, downlink control information based on the time-frequency resource of the control channel include: determining, by the base station, a time-frequency resource of a basic set of the control channel; and transmitting, by the base station, the downlink control information based on the time-frequency resource of the basic set, where the downlink control information includes information about a time-frequency resource of an extended set of the control channel.

In other possible implementations, the method further includes: transmitting, by the base station, system information, where the system information includes information about the time-frequency resource of the basic set of the control channel.

In other possible implementations, that the system information includes information about the time-frequency resource of the basic set of the control channel is specifically: the system information includes information about a quantity of symbols occupied by the time-frequency resource of the basic set of the control channel; or the system information includes a quantity of physical resource blocks occupied by the time-frequency resource of the basic set of the control channel; or the system information includes information about a quantity of physical resource blocks occupied by the time-frequency resource of the basic set of the control channel; or the system information includes information about a quantity of resource block pairs occupied by the time-frequency resource of the basic set of the control channel; or the system information includes information about a quantity of subcarriers occupied by the time-frequency resource of the basic set of the control channel; or the system information includes information about a quantity of control channel elements CCEs corresponding to the time-frequency resource of the basic set of the control channel.

In other possible implementations, the determining, by the base station, a time-frequency resource of a basic set of the control channel includes: determining, by the base station, the time-frequency resource of the basic set of the control channel according to a preset rule.

In other possible implementations, the preset rule is that the time-frequency resource of the basic set of the control channel occupies one symbol.

In other possible implementations, the transmitting, by the base station, downlink control information based on the time-frequency resource of the basic set, where the downlink control information includes information about a time-frequency resource of an extended set of the control channel, includes: transmitting, by the base station, the downlink control information based on the time-frequency resource of the basic set in a subframe n, where the downlink control information includes information about a time-frequency resource of the extended set of the control channel in a subframe n+k, where n is an integer, and k is a positive integer greater than or equal to 0. Optionally, a value of k is equal to 1.

In other possible implementations, the downlink control information includes information indicating whether the extended set of the control channel exists; or the downlink control information includes information indicating a transmission mode corresponding to the extended set of the control channel.

In other possible implementations, the basic set exists in all subframes including symbols used for downlink transmission.

In other possible implementations, the extended set does not exist in a subframe carrying a synchronization signal and/or system information.

A fourth aspect of the present disclosure provides a device, used as a first device and including:

a determining module, configured to determine a location of a reference signal; and a transceiver module, configured to transmit or receive the reference signal based on the determined location of the reference signal.

In some possible implementations, the reference signal includes a first reference signal and a second reference signal, and the determining module is specifically configured to: determine a location of the first reference signal, where the first reference signal is used for downlink data demodulation; and determine a location of the second reference signal, where the second reference signal is used for uplink data demodulation; where a time domain location of the first reference signal is the same as a time domain location of the second reference signal.

Optionally, the transceiver module is specifically configured to receive the first reference signal based on the location of the first reference signal, and transmit the second reference signal based on the location of the second reference signal; or the first device transmits the second reference signal based on the location of the first reference signal, and receives the second reference signal based on the location of the second reference signal.

In other possible implementations, a frequency domain location of the first reference signal is the same as a frequency domain location of the second reference signal.

In other possible implementations, the first reference signal is carried in a first transmission unit, the location of the first reference signal is a location of the first reference signal in the first transmission unit, the second reference signal is carried in a second transmission unit, the location of the second reference signal is a location of the second reference signal in the second transmission unit, that a time domain location of the first reference signal is the same as a time domain location of the second reference signal is specifically that a time domain location of the first reference signal in the first transmission unit is the same as a time domain location of the second reference signal in the second transmission unit, and duration corresponding to the first transmission unit is equal to duration corresponding to the second transmission unit.

In other possible implementations, the first reference signal is carried in a first transmission unit, the location of the first reference signal is a location of the first reference signal in the first transmission unit, the second reference signal is carried in a second transmission unit, the location of the second reference signal is a location of the second reference signal in the second transmission unit, that a time domain location of the first reference signal is the same as a time domain location of the second reference signal is that a time domain location of the first reference signal in the first transmission unit is the same as a time domain location of the second reference signal in the second transmission unit, that a frequency domain location of the first reference signal is the same as a frequency domain location of the second reference signal is that a frequency domain location of the first reference signal in the first transmission unit is the same as a frequency domain location of the second reference signal in the second transmission unit, and duration corresponding to the first transmission unit is equal to duration corresponding to the second transmission unit.

In other possible implementations, the first reference signal is located on a third symbol in the first transmission unit, and the second reference signal is located on a third symbol in the second transmission unit.

In other possible implementations, the first reference signal is carried in a first subframe, the location of the first reference signal is a location of the first reference signal in the first subframe, the second reference signal is carried in a second subframe, the location of the second reference signal is a location of the second reference signal in the second subframe, that a time domain location of the first reference signal is the same as a time domain location of the second reference signal is that a time domain location of the first reference signal in the first subframe is the same as a time domain location of the second reference signal in the second subframe, a quantity of symbols used for downlink transmission in the first subframe is greater than a quantity of symbols used for uplink transmission in the first subframe, and a quantity of symbols used for downlink transmission in the second subframe is less than a quantity of symbols used for uplink transmission in the second subframe.

In other possible implementations, the first reference signal is carried in a first subframe, the location of the first reference signal is a location of the first reference signal in the first subframe, the second reference signal is carried in a second subframe, the location of the second reference signal is a location of the second reference signal in the second subframe, that a time domain location of the first reference signal is the same as a time domain location of the second reference signal is that a time domain location of the first reference signal in the first subframe is the same as a time domain location of the second reference signal in the second subframe, that a frequency domain location of the first reference signal is the same as a frequency domain location of the second reference signal is that a frequency domain location of the first reference signal in the first subframe is the same as a frequency domain location of the second reference signal in the second subframe, a quantity of symbols used for downlink transmission in the first subframe is greater than a quantity of symbols used for uplink transmission in the first subframe, and a quantity of symbols used for downlink transmission in the second subframe is less than a quantity of symbols used for uplink transmission in the second subframe.

In other possible implementations, the first subframe includes a symbol used for downlink transmission, a guard period (GP), and a symbol used for uplink transmission, uplink transmission corresponding to a symbol included in the first subframe and used for uplink transmission includes hybrid automatic repeat request-acknowledgment (HARQ-ACK) transmission, and downlink transmission corresponding to a symbol included in the first subframe and used for downlink transmission includes downlink control transmission, downlink data transmission, and transmission of the first reference signal; and the second subframe includes a symbol used for downlink transmission, a guard period (GP), and a symbol used for uplink transmission, downlink transmission corresponding to a symbol included in the second subframe and used for downlink transmission includes downlink control transmission, and uplink transmission corresponding to a symbol included in the second subframe and used for uplink transmission includes uplink control transmission, uplink data transmission, and transmission of the second reference signal.

In other possible implementations, the first subframe starts with a symbol included in the first subframe and used for downlink transmission, and ends with a symbol included in the first subframe and used for uplink transmission; and the second subframe starts with a symbol included in the second subframe and used for downlink transmission, and ends with a symbol included in the second subframe and used for uplink transmission.

In other possible implementations, that a time domain location of the first reference signal in the first subframe is the same as a time domain location of the second reference signal in the second subframe is specifically that an index of a symbol occupied by the first reference signal in the first subframe is the same as an index of a symbol occupied by the second reference signal in the second subframe.

In other possible implementations, the first reference signal is located on a third symbol in the first subframe, and the second reference signal is located on a third symbol in the second subframe.

In other possible implementations, the first device is user equipment, and the transceiver module is specifically configured to receive the first reference signal based on the location of the first reference signal, and transmit the second reference signal based on the location of the second reference signal.

In other possible implementations, the first device is a base station, and the transceiver module is specifically configured to transmit the first reference signal based on the location of the first reference signal, and receive the second reference signal based on the location of the second reference signal.

A fifth aspect of the present disclosure provides user equipment, including:

a determining module, configured to determine a time-frequency resource of a control channel; and a receiving module, configured to receive downlink control information based on the time-frequency resource of the control channel.

In some possible implementations, the determining module is specifically configured to determine a time-frequency resource of a first control channel, and determine a time-frequency resource of a second control channel; and the receiving module is specifically configured to detect first downlink control information based on the time-frequency resource of the first control channel, and detect second downlink control information based on the time-frequency resource of the second control channel.

In other possible implementations, a symbol occupied by the time-frequency resource of the first control channel is located before a symbol occupied by the time-frequency resource of the second control channel.

In other possible implementations, the time-frequency resource of the first control channel occupies i symbols, corresponding to symbols $l_0, \ldots, l_{i-1}$, where i is a positive integer greater than or equal to 1; the time-frequency resource of the second control channel starts with a symbol $l_{i+k}$, where k is a positive integer greater than or equal to 1; and a symbol $l_i$ to a symbol $l_{i+k-1}$ are used to transmit a reference signal, where the reference signal is used to demodulate the second control channel and/or data.

In other possible implementations, the time-frequency resource of the first control channel occupies i symbols, corresponding to symbols $l_0, \ldots, l_{i-1}$, where i is a positive integer greater than or equal to 1; the time-frequency resource of the second control channel starts with a symbol $l_i$, or the time-frequency resource of the second control channel is located on a symbol after the symbol $l_{i-1}$; and the second control channel and downlink data are multiplexed on a time-frequency resource corresponding to the symbol after the symbol $l_{i-1}$.

In other possible implementations, the determining module is specifically configured to determine a time-frequency resource of the first control channel in a first subframe, and determine a time-frequency resource of the second control channel in the first subframe, where the first subframe includes a symbol used for downlink transmission, a guard period (GP), and a symbol used for uplink transmission, uplink transmission corresponding to a symbol included in the first subframe and used for uplink transmission includes hybrid automatic repeat request-acknowledgment (HARQ-ACK) transmission, and downlink transmission corresponding to a symbol included in the first subframe and used for downlink transmission includes downlink control transmission, downlink data transmission, and transmission of a first reference signal; and symbols included in the first subframe and used for downlink transmission include a symbol occupied by the time-frequency resource of the first control channel and a symbol occupied by the time-frequency resource of the second control channel.

In other possible implementations, the time-frequency resource of the first control channel occupies i symbols in the first subframe, corresponding to a first symbol to an $i^{th}$ symbol in the first subframe, where i is a positive integer greater than or equal to 1; the time-frequency resource of the second control channel starts with an $(i+k+1)^{th}$ symbol in the first subframe, where k is a positive integer greater than or equal to 1; an $(i+1)^{th}$ symbol to an $(i+k)^{th}$ symbol in the first subframe are used to transmit a reference signal, where the reference signal is used to demodulate the second control channel and/or data; and an $(l-k1)^{th}$ symbol to an $l^{th}$ symbol in the first subframe are symbols used for uplink transmission in the first subframe, where l is a quantity of symbols included in the first subframe, and k1 is a positive integer greater than or equal to 1.

In other possible implementations, the time-frequency resource of the first control channel occupies i symbols in the first subframe, corresponding to a first symbol to an $i^{th}$ symbol in the first subframe, where i is a positive integer greater than or equal to 1; the time-frequency resource of the second control channel starts with an $(i+1)^{th}$ symbol in the first subframe, or the time-frequency resource of the second control channel is located on a symbol after the $i^{th}$ symbol in the first subframe; the second control channel and downlink data are multiplexed on time-frequency resources corresponding to the $i^{th}$ symbol in the first subframe to an $(i+k2)^{th}$ symbol in the first subframe, where k2 is a positive integer greater than 1; an $(i+k2+1)^{th}$ symbol in the first subframe is a guard period GP in the first subframe; and an $(i+k2+2)^{th}$ symbol to an $l^{th}$ symbol in the first subframe are symbols used for uplink transmission in the first subframe, where l is a quantity of symbols included in the first subframe.

In other possible implementations, the determining module is specifically configured to determine a time-frequency resource of the first control channel in a second subframe, and determine that no time-frequency resource of the second control channel exists in the second subframe, where the second subframe includes a symbol used for downlink transmission, a guard period (GP), and a symbol used for uplink transmission, downlink transmission corresponding to a symbol included in the second subframe and used for downlink transmission includes downlink control transmission, and uplink transmission corresponding to a symbol included in the second subframe and used for uplink transmission includes transmission of the second reference signal, uplink data transmission, and uplink control transmission.

In other possible implementations, a symbol included in the second subframe and used for downlink transmission is a first symbol in the second subframe, and the time-frequency resource of the first control channel occupies the first symbol in the second subframe.

In other possible implementations, the determining module is further configured to determine the time-frequency resource of the second control channel according to the first downlink control information.

In other possible implementations, the first downlink control information is carried in a subframe n, and the second control channel is carried in the subframe n; or the first downlink control information is carried in a subframe n, and the second control channel is carried in a subframe n+1; where n is a positive integer.

In other possible implementations, the receiving module is further configured to receive a downlink shared channel according to the first downlink control information and the second downlink control information, where the first downlink control information includes information about the time-frequency resource of the second downlink control channel and/or information about a time-frequency resource of the downlink shared channel; and the second downlink control information includes modulation and coding information of the downlink shared channel.

In other possible implementations, the first control channel is demodulated according to a reference signal carried on the time-frequency resource of the first control channel.

In other possible implementations, the determining module is specifically configured to determine a time-frequency resource of the control channel in a subframe n; and if the subframe n belongs to a subframe set 1, the determining module determines the time-frequency resource of the control channel in the subframe n according to a preset rule; or if the subframe n belongs to a subframe set 2, the determining module determines the time-frequency resource of the control channel in the subframe n according to downlink control signaling; where the subframe set 1 includes a subframe carrying a synchronization signal and/or system information, and the subframe set 2 does not include a subframe carrying a synchronization signal and/or system information; and n is an integer greater than or equal to 0.

In other possible implementations, the determining module is specifically configured to determine the time-frequency resource of the control channel in the subframe n according to downlink control signaling carried in a subframe n–k, where k is an integer greater than or equal to 0.

In other possible implementations, the determining module is specifically configured to determine the time-frequency resource of the control channel in the subframe n according to downlink control signaling carried in a subframe n–1.

In other possible implementations, the time-frequency resource of the control channel in the subframe n occupies two symbols in time domain.

In other possible implementations, the control channel includes a control channel set 1, and the determining module is specifically configured to determine a time-frequency resource of the control channel set 1, where the control channel in the control channel set 1 uses a distributed transmission mode.

In other possible implementations, the control channel includes a control channel set 1 and a control channel set 2, and the determining module is specifically configured to determine a time-frequency resource of the control channel set 1, and determine a time-frequency resource of the control channel set 2, where the control channel in the control channel set 1 uses a distributed transmission mode, and the control channel in the control channel set 2 uses a localized transmission mode.

In other possible implementations, the determining module is further configured to detect downlink control information in a subframe n, and determine a time-frequency resource of the control channel set 1 in a subframe n+k according to the downlink control information detected in the subframe n, where n is an integer, and k is a positive integer greater than or equal to 1.

In other possible implementations, the determining module is further configured to determine a time-frequency resource of the control channel set 2 in the subframe n+k based on the time-frequency resource of the control channel set 1 in the subframe n+k.

In other possible implementations, a subframe carrying the control channel does not carry a synchronization signal and/or system information.

In other possible implementations, the determining module is specifically configured to determine a time-frequency resource of a basic set of the control channel, detect the downlink control information based on the time-frequency resource of the basic set, and determine a time-frequency resource of an extended set of the control channel according to the detected downlink control information.

In other possible implementations, the receiving module is further configured to receive system information; and the determining module is further configured to determine the time-frequency resource of the basic set of the control channel according to the system information.

In other possible implementations, the determining module is further configured to determine, according to the system information, a quantity of symbols occupied by the time-frequency resource of the basic set of the control channel, or determine, according to the system information, a quantity of physical resource blocks occupied by the time-frequency resource of the basic set of the control channel, or determine, according to the system information, information about a quantity of physical resource blocks occupied by the time-frequency resource of the basic set of the control channel, or determine, according to the system information, information about a quantity of resource block pairs occupied by the time-frequency resource of the basic set of the control channel, or determine, according to the system information, information about a quantity of subcarriers occupied by the time-frequency resource of the basic set of the control channel, or determine, according to the system information, a quantity of control channel elements (CCE) corresponding to the time-frequency resource of the basic set of the control channel.

In other possible implementations, the determining module is specifically configured to determine the time-frequency resource of the basic set of the control channel according to a preset rule.

In other possible implementations, the preset rule is that the time-frequency resource of the basic set of the control channel occupies one symbol.

In other possible implementations, the receiving module is further configured to receive system information; and the determining module is specifically configured to determine, according to the system information, a quantity of physical resource blocks occupied by the time-frequency resource of the basic set of the control channel or a quantity of control channel elements corresponding to the time-frequency resource of the basic set of the control channel or a quantity of physical resource blocks occupied by the time-frequency resource of the basic set of the control channel or a quantity of resource blocks occupied by the time-frequency resource of the basic set of the control channel or a quantity of subcarriers occupied by the time-frequency resource of the basic set of the control channel, and determine, by the user equipment according to a predefined rule, a quantity of symbols occupied by the time-frequency resource of the control channel, where the predefined rule may be that the quantity of the symbols occupied by the time-frequency resource of the control channel is a fixed value, or that the quantity of the symbols occupied by the time-frequency resource of the control channel is a preset value, for example, 2 symbols.

In other possible implementations, the user equipment further includes: a detection module, configured to detect the downlink control information based on the time-frequency resource of the basic set in a subframe n; and the determining module is specifically configured to determine a time-frequency resource of the extended set of the control channel in a subframe n+k according to the downlink control information detected in the subframe n, where n is an integer, and k is a positive integer greater than or equal to 0. Optionally, a value of k is equal to 1.

In other possible implementations, the determining module is further configured to determine, according to the detected downlink control information, whether the extended set of the control channel exists, or determine, according to the detected downlink control information, a transmission mode corresponding to the extended set of the control channel.

In other possible implementations, the basic set exists in all subframes including symbols used for downlink transmission.

In other possible implementations, the extended set does not exist in a subframe carrying a synchronization signal and/or system information.

A sixth aspect of the present disclosure provides a base station, including:

a determining module, configured to determine a time-frequency resource of a control channel; and a transmission module, configured to transmit downlink control information based on the time-frequency resource of the control channel.

In some possible implementations, the determining module is specifically configured to determine a time-frequency resource of a first control channel, and determine a time-frequency resource of a second control channel; and the transmission module is specifically configured to transmit first downlink control information based on the time-frequency resource of the first control channel, and transmit second downlink control information based on the time-frequency resource of the second control channel.

In other possible implementations, a symbol occupied by the time-frequency resource of the first control channel is located before a symbol occupied by the time-frequency resource of the second control channel.

In other possible implementations, the time-frequency resource of the first control channel occupies i symbols, corresponding to symbols $l_0, \ldots, l_{i-1}$, where i is a positive integer greater than or equal to 1; the time-frequency resource of the second control channel starts with a symbol $l_{i+k}$, where k is a positive integer greater than or equal to 1; and a symbol $l_i$ to a symbol $l_{i+k-1}$ are used to transmit a reference signal, where the reference signal is used to demodulate the second control channel and/or data.

In other possible implementations, the time-frequency resource of the first control channel occupies i symbols, corresponding to symbols $l_0, \ldots, l_{i-1}$, where i is a positive integer greater than or equal to 1; the time-frequency resource of the second control channel starts with a symbol $l_i$, or the time-frequency resource of the second control channel is located on a symbol after the symbol $l_{i-1}$; and the second control channel and downlink data are multiplexed on a time-frequency resource corresponding to the symbol after the symbol $l_{i-1}$.

In other possible implementations, the determining module is specifically configured to determine a time-frequency resource of the first control channel in a first subframe, and determine a time-frequency resource of the second control channel in the first subframe, where the first subframe includes a symbol used for downlink transmission, a guard period (GP), and a symbol used for uplink transmission, uplink transmission corresponding to a symbol included in the first subframe and used for uplink transmission includes hybrid automatic repeat request-acknowledgment (HARQ-ACK) transmission, and downlink transmission corresponding to a symbol included in the first subframe and used for downlink transmission includes downlink control transmission, downlink data transmission, and transmission of a first reference signal; and symbols included in the first subframe and used for downlink transmission include a symbol occupied by the time-frequency resource of the first control channel and a symbol occupied by the time-frequency resource of the second control channel.

In other possible implementations, the time-frequency resource of the first control channel occupies i symbols in the first subframe, corresponding to a first symbol to an $i^{th}$ symbol in the first subframe, where i is a positive integer greater than or equal to 1; the time-frequency resource of the second control channel starts with an $(i+k+1)^{th}$ symbol in the first subframe, where k is a positive integer greater than or equal to 1; an $(i+1)^{th}$ symbol to an $(i+k)^{th}$ symbol in the first subframe are used to transmit a reference signal, where the reference signal is used to demodulate the second control channel and/or data; and an $(l-k1)^{th}$ symbol to an $l^{th}$ symbol in the first subframe are symbols used for uplink transmission in the first subframe, where l is a quantity of symbols included in the first subframe, and k1 is a positive integer greater than or equal to 1.

In other possible implementations, the time-frequency resource of the first control channel occupies i symbols in the first subframe, corresponding to a first symbol to an $i^{th}$ symbol in the first subframe, where i is a positive integer greater than or equal to 1; the time-frequency resource of the second control channel starts with an $(i+1)^{th}$ symbol in the first subframe, or the time-frequency resource of the second control channel is located on a symbol after the $i^{th}$ symbol in the first subframe; the second control channel and downlink data are multiplexed on time-frequency resources corresponding to the $i^{th}$ symbol in the first subframe to an $(i+k2)^{th}$ symbol in the first subframe, where k2 is a positive integer greater than 1; an $(i+k2+1)^{th}$ symbol in the first subframe is a guard period (GP) in the first subframe; and an $(i+k2+2)^{th}$ symbol to an $l^{th}$ symbol in the first subframe are symbols used for uplink transmission in the first subframe, where l is a quantity of symbols included in the first subframe.

In other possible implementations, the determining module is specifically configured to determine a time-frequency resource of the first control channel in a second subframe, and determine that no time-frequency resource of the second control channel exists in the second subframe, where the second subframe includes a symbol used for downlink transmission, a guard period (GP), and a symbol used for uplink transmission, downlink transmission corresponding to a symbol included in the second subframe and used for downlink transmission includes downlink control transmission, and uplink transmission corresponding to a symbol included in the second subframe and used for uplink transmission includes transmission of the second reference signal, uplink data transmission, and uplink control transmission.

In other possible implementations, a symbol included in the second subframe and used for downlink transmission is a first symbol in the second subframe, and the time-frequency resource of the first control channel occupies the first symbol in the second subframe.

In other possible implementations, the first downlink control information includes information about the time-frequency resource of the second control channel.

In other possible implementations, the first downlink control information is carried in a subframe n, and the second control channel is carried in the subframe n; or the first downlink control information is carried in a subframe n, and the second control channel is carried in a subframe n+1; where n is a positive integer.

In other possible implementations, the transmission module is further configured to transmit a downlink shared channel, where the first downlink control information includes the information about the time-frequency resource of the second downlink control channel and/or information about a time-frequency resource of the downlink shared channel, and the second downlink control information includes modulation and coding information of the downlink shared channel.

In other possible implementations, the transmission module is further configured to transmit a reference signal on the time-frequency resource of the first control channel, where the reference signal is used to demodulate the first control channel.

In other possible implementations, the transmission module is further configured to transmit downlink control signaling, where the downlink control signaling is used to determine a time-frequency resource of the control channel in a subframe n, the subframe n does not carry a synchronization signal and/or system information, and n is an integer greater than or equal to 0.

In other possible implementations, the transmission module is further configured to transmit the downlink control signaling in a subframe n−k, where k is an integer greater than or equal to 0. Optionally, k is equal to 1.

In other possible implementations, the determining module is specifically configured to determine a time-frequency resource of the control channel in a subframe n according to a predefined rule, where the subframe n carries a synchronization signal and/or system information. The predefined rule may be that a quantity of symbols occupied by the time-frequency resource of the control channel is a fixed value, or that a quantity of symbols occupied by the time-frequency resource of the control channel is a preset value, for example, 2 symbols.

In other possible implementations, the control channel includes a control channel set 1, the determining module is specifically configured to determine a time-frequency resource of the control channel set 1, and the transmission module is further configured to transmit the control channel based on the time-frequency resource of the control channel set 1 by using a distributed transmission mode.

In other possible implementations, the control channel includes a control channel set 1 and a control channel set 2, and the determining module is specifically configured to determine a time-frequency resource of the control channel set 1, and determine a time-frequency resource of the control channel set 2, where the control channel in the control channel set 1 uses a distributed transmission mode, and the control channel in the control channel set 2 uses a localized transmission mode.

In other possible implementations, the transmission module is further configured to transmit downlink control information in a subframe n, where the downlink control information includes information about a time-frequency resource of the control channel set 1 in a subframe n+k, n is an integer, and k is a positive integer greater than or equal to 1.

In other possible implementations, the determining module is specifically configured to determine a time-frequency resource of a basic set of the control channel; and the transmission module is specifically configured to transmit the downlink control information based on the time-frequency resource of the basic set, where the downlink control information includes information about a time-frequency resource of an extended set of the control channel.

In other possible implementations, the transmission module is further configured to transmit system information, where the system information includes information about the time-frequency resource of the basic set of the control channel.

In other possible implementations, that the system information includes information about the time-frequency resource of the basic set of the control channel is specifically: the system information includes information about a quantity of symbols occupied by the time-frequency resource of the basic set of the control channel; or the system information includes information about a quantity of physical resource block pairs occupied by the time-frequency resource of the basic set of the control channel; or the system information includes information about a quantity of physical resource blocks occupied by the time-frequency resource of the basic set of the control channel; or the system information includes information about a quantity of resource blocks occupied by the time-frequency resource of the basic set of the control channel; or the system information includes information about a quantity of subcarriers occupied by the time-frequency resource of the basic set of the control channel; or the system information includes information about a quantity of control channel elements (CCE) corresponding to the time-frequency resource of the basic set of the control channel.

In other possible implementations, the determining module is specifically configured to determine the time-frequency resource of the basic set of the control channel according to a preset rule.

In other possible implementations, the preset rule is that the time-frequency resource of the basic set of the control channel occupies one symbol.

In other possible implementations, the transmission module is specifically configured to transmit the downlink control information based on the time-frequency resource of the basic set in a subframe n, where the downlink control information includes information about a time-frequency resource of the extended set of the control channel in a subframe n+k, where n is an integer, and k is a positive integer greater than or equal to 0. Optionally, a value of k is equal to 1.

In other possible implementations, the downlink control information includes information indicating whether the extended set of the control channel exists; or the downlink control information includes information indicating a transmission mode corresponding to the extended set of the control channel.

In other possible implementations, the basic set exists in all subframes including symbols used for downlink transmission.

In other possible implementations, the extended set does not exist in a subframe carrying a synchronization signal and/or system information.

As can be seen from the foregoing technical solutions, the embodiments of the present disclosure have the following advantages: By determining the location of the reference signal, the first device can perform uplink-downlink interference estimation by using the reference signal and better transmit or receive the reference signal, so as to better support dynamic TDD and keep forward compatibility.

DESCRIPTION OF EMBODIMENTS

Embodiments of the present disclosure provide a method for transmitting and receiving information, user equipment, and a base station to better support dynamic TDD and keep forward compatibility.

In the specification, claims, and accompanying drawings of the present disclosure, the terms "first", "second", "third", "fourth", and so on (if any) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device. In addition, the term "and/or" in this specification and claims of the present disclosure describes only an association relationship for describing associated objects and represents that three relationships may exist. For example, A and/or B may represent the following three cases: Only A exists, both A and B exist, and only B exists. In addition, the character "/" in this specification indicates an "or" relationship between the associated objects.

The present disclosure is mainly applied to a 5G communications system, a Long Term Evolution (LTE) system, or an LTE-advanced system, and may be applied to a single carrier or multiple carriers.

The following describes the technical solutions of the present disclosure with reference to specific embodiments.

Figure 1:
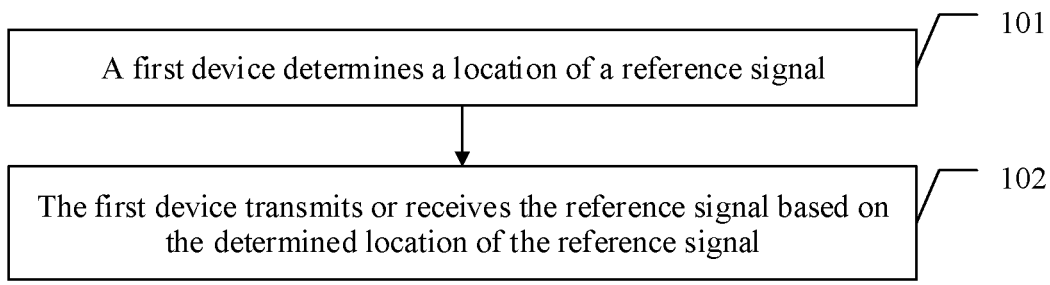
FIG. 1 is a schematic diagram of an embodiment of a method for transmitting and receiving information according to an embodiment of the present disclosure.

Referring to FIG. 1, an embodiment of a method for transmitting and receiving information in an embodiment of the present disclosure includes the following steps.

101. A first device determines a location of a reference signal.

In this embodiment, the first device may be user equipment, or may be a base station. The reference signal may include a first reference signal and a second reference signal, where the first reference signal may be referred to as a first demodulation reference signal (DMRS), and the second reference signal may be referred to as a second demodulation reference signal (DMRS). The first reference signal may be used for uplink data demodulation, and the second reference signal may be used for downlink data demodulation. A location (time domain location and/or frequency domain location) of the first reference signal may be the same as a location (time domain location and/or frequency domain location) of the second reference signal.

In addition, if the location (time domain location and/or frequency domain location) of the first reference signal is the same as the location (time domain location and/or frequency domain location) of the second reference signal, the first device can better perform uplink-downlink interference estimation by using the first reference signal and the second reference signal, and therefore better perform uplink-downlink interference cancellation, so as to better use TDD, better match an actual service, improve spectrum efficiency of a system, and better provide a low latency service.

102. The first device transmits or receives the reference signal based on the determined location of the reference signal.

In this embodiment, after the first device determines the location of the reference signal, the first device transmits or receives the reference signal based on the determined location of the reference signal.

Optionally, the first device receives the first reference signal based on the location of the first reference signal, and transmits the second reference signal based on the location of the second reference signal; or the first device transmits the second reference signal based on the location of the first reference signal, and receives the second reference signal based on the location of the second reference signal.

In this embodiment, because the first device may be user equipment or may be a base station, for ease of understanding the technical solutions of the present disclosure, two cases in which the first device is user equipment and the first device is a base station are hereinafter described separately with reference to specific embodiments.

Figure 2:
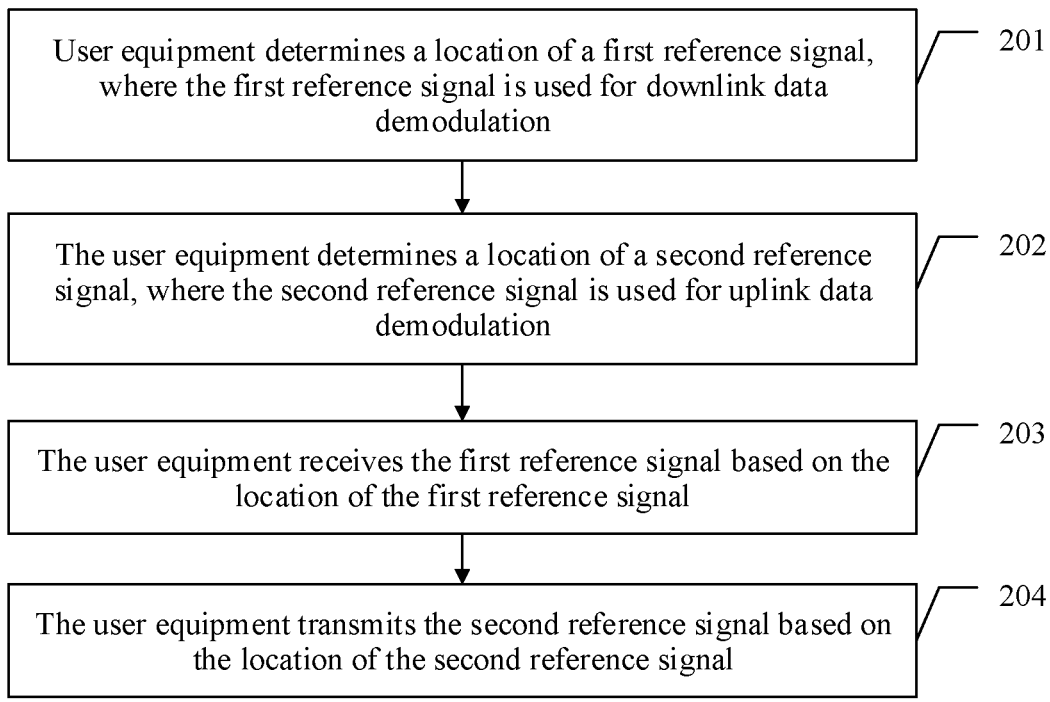
FIG. 2 is a schematic diagram of another embodiment of a method for transmitting and receiving information according to an embodiment of the present disclosure.

1. When the reference signal includes a first reference signal and a second reference signal, and the first device is user equipment, referring to FIG. 2, another embodiment of the method for transmitting and receiving information in this embodiment of the present disclosure includes the following steps.

201. User equipment determines a location of a first reference signal, where the first reference signal is used for downlink data demodulation.

202. The user equipment determines a location of a second reference signal, where the second reference signal is used for uplink data demodulation.

In this embodiment, a sequence of step 201 and step 202 is not limited, and a mutual dependency relationship between step 201 and step 202 is not limited either.

It should be noted that, in this embodiment, a time domain location of the first reference signal is the same as a time domain location of the second reference signal, or a time domain location and a frequency domain location of the first reference signal are the same as a time domain location and a frequency domain location of the second reference signal.

Optionally, the time domain location of the first reference signal is the same as the time domain location of the second reference signal. That the time domain location of the first reference signal is the same as the time domain location of the second reference signal may also be that a symbol index of a symbol occupied by the first reference signal is the same as a symbol index of a symbol occupied by the second reference signal.

Further optionally, the frequency domain location of the first reference signal is the same as the frequency domain location of the second reference signal.

Further optionally, the user equipment may use a transmission unit to carry a reference signal, or the user equipment may use a subframe to carry a reference signal.

Manner 1: Transmission Unit

The first reference signal is carried in a first transmission unit, the location of the first reference signal is a location of the first reference signal in the first transmission unit, the second reference signal is carried in a second transmission unit, the location of the second reference signal is a location of the second reference signal in the second transmission unit, that the time domain location of the first reference signal is the same as the time domain location of the second reference signal is specifically that a time domain location of the first reference signal in the first transmission unit is the same as a time domain location of the second reference signal in the second transmission unit, and duration corresponding to the first transmission unit is equal to duration corresponding to the second transmission unit.

It should be noted that, the transmission unit in all the embodiments of the present disclosure may also be referred to as a transmission time unit. The transmission time unit may be a subframe, or may be a transmission time interval, or may be duration required for completing transmission of a shared channel, including transmission of a control channel corresponding to the shared channel, transmission of a reference signal, and transmission of the shared channel.

Further optionally, that the frequency domain location of the first reference signal is the same as the frequency domain location of the second reference signal is that a frequency domain location of the first reference signal in the first transmission unit is the same as a frequency domain location of the second reference signal in the second transmission unit.

Further optionally, a time-frequency resource location of the first reference signal in the first transmission unit is the same as a time-frequency resource location in the second transmission unit.

Further optionally, the first reference signal is located on a third symbol in the first transmission unit, and the second reference signal is located on a third symbol in the second transmission unit.

Manner 2: Subframe

The first reference signal is carried in a first subframe, the location of the first reference signal is a location of the first reference signal in the first subframe, the second reference signal is carried in a second subframe, the location of the second reference signal is a location of the second reference signal in the second subframe, that the time domain location of the first reference signal is the same as the time domain location of the second reference signal is that a time domain location of the first reference signal in the first subframe is the same as a time domain location of the second reference signal in the second subframe, that the frequency domain location of the first reference signal is the same as the frequency domain location of the second reference signal is that a frequency domain location of the first reference signal in the first subframe is the same as a frequency domain location of the second reference signal in the second subframe, a quantity of symbols used for downlink transmission in the first subframe is greater than a quantity of symbols used for uplink transmission in the first subframe, and a quantity of symbols used for downlink transmission in the second subframe is less than a quantity of symbols used for uplink transmission in the second subframe.

Herein that a frequency domain location of the first reference signal in the first subframe is the same as a frequency domain location of the second reference signal in the second subframe may be that an index of a frequency domain resource occupied by the first reference signal in the first subframe is the same as an index of a frequency domain resource occupied by the second reference signal in the second subframe, or that an index of a resource element (RE) occupied by the first reference signal in the first subframe is the same as an index of a resource element occupied by the second reference signal in the second subframe. A frequency band occupied by the first reference signal and a frequency band occupied by the second reference signal may be a same frequency band, or may be different frequency bands.

Further optionally, the first subframe includes a symbol used for downlink transmission, a guard period (GP), and a symbol used for uplink transmission, uplink transmission corresponding to a symbol included in the first subframe and used for uplink transmission includes hybrid automatic repeat request-acknowledgment (HARQ-ACK) transmission, and downlink transmission corresponding to a symbol included in the first subframe and used for downlink transmission includes downlink control transmission, downlink data transmission, and transmission of the first reference signal.

Further optionally, the first subframe starts with a symbol included in the first subframe and used for downlink transmission, and ends with a symbol included in the first subframe and used for uplink transmission.

Further optionally, the second subframe includes a symbol used for downlink transmission, a guard period (GP), and a symbol used for uplink transmission, downlink transmission corresponding to a symbol included in the second subframe and used for downlink transmission includes downlink control transmission, and uplink transmission corresponding to a symbol included in the second subframe and used for uplink transmission includes uplink control transmission, uplink data transmission, and transmission of the second reference signal.

Further optionally, the second subframe starts with a symbol included in the second subframe and used for downlink transmission, and ends with a symbol included in the second subframe and used for uplink transmission.

Further optionally, that a time domain location of the first reference signal in the first subframe is the same as a time domain location of the second reference signal in the second subframe is specifically that an index of a symbol occupied by the first reference signal in the first subframe is the same as an index of a symbol occupied by the second reference signal in the second subframe.

Further optionally, the first reference signal is located on a third symbol in the first subframe, and the second reference signal is located on a third symbol in the second subframe.

Figure 3:
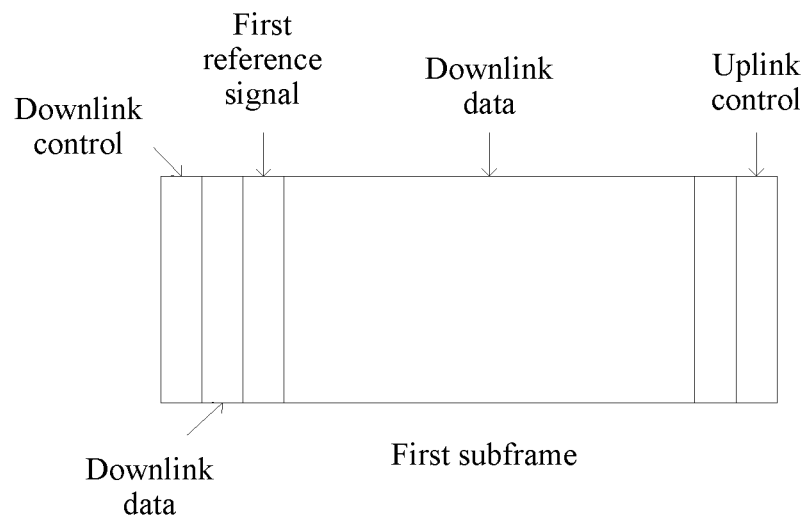
FIG. 3 is a schematic diagram of a location of a first reference signal in a first subframe according to an embodiment of the present disclosure.
Figure 4:
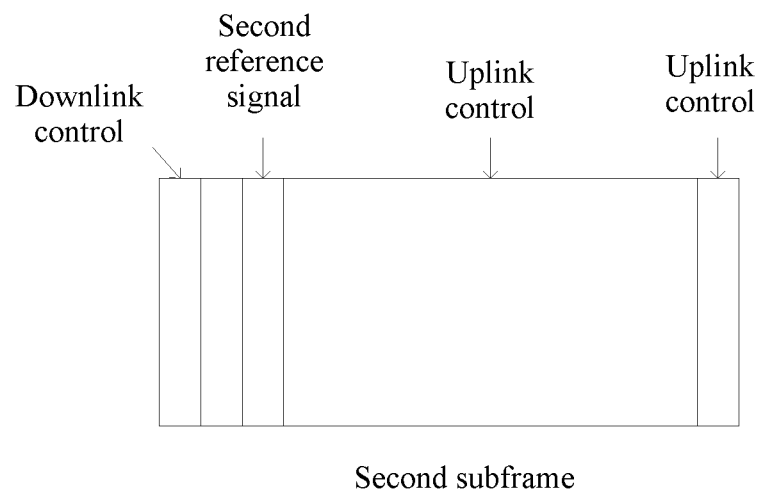
FIG. 4 is a schematic diagram of a location of a second reference signal in a second subframe according to an embodiment of the present disclosure.

In an example in which a subframe includes 14 symbols, the location of the first reference signal in the first subframe and the location of the second reference signal in the second subframe may be respectively shown in FIG. 3 and FIG. 4. FIG. 3 provides an example 1 of a time domain structure of the first subframe. In FIG. 3, a first symbol in the first subframe is a symbol used for downlink control transmission, the first reference signal is carried on the third symbol in the first subframe, a GP occupies a thirteenth symbol in the first subframe, and a fourteenth symbol in the first subframe is used for uplink control transmission. FIG. 4 provides an example 1 of a time domain structure of the second subframe. In FIG. 4, a first symbol in the second subframe is a symbol used for downlink control transmission, the second reference signal is carried on the third symbol in the second subframe, a GP occupies a second symbol in the second subframe, and optionally, a fourteenth symbol in the second subframe is used for uplink control transmission. As can be seen from the figures, in FIG. 3 and FIG. 4, the location of the first reference signal in the first subframe is the same as the location of the second reference signal in the second subframe. In FIG. 3 and FIG. 4, the reference signal is placed ahead on the third symbol in the subframe. Therefore, data demodulation and decoding can be performed quickly while it is ensured that the location of the first reference signal is the same as the location of the second reference signal.

Figure 5:
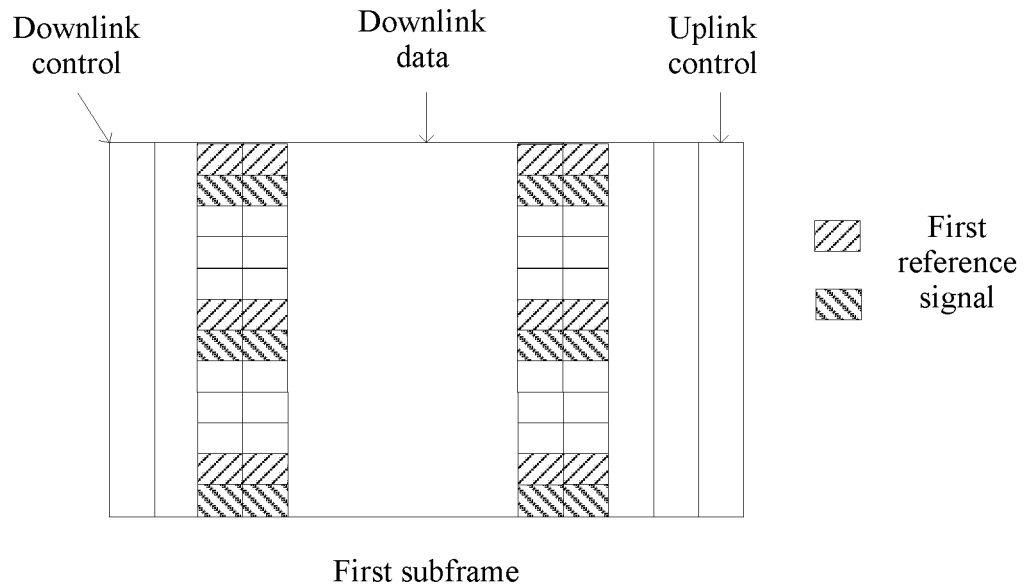
FIG. 5 is another schematic diagram of a location of a first reference signal in a first subframe according to an embodiment of the present disclosure.
Figure 6:
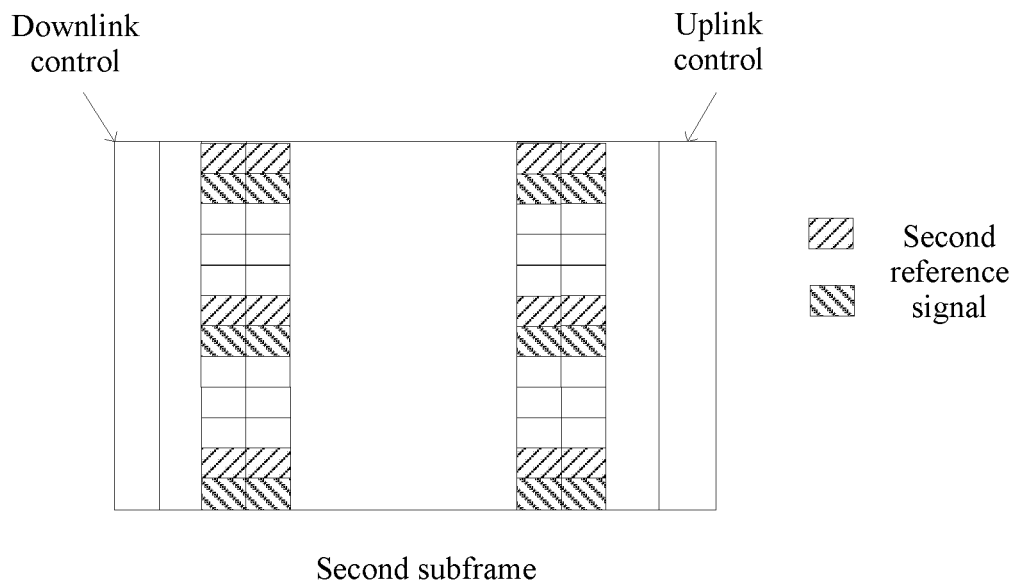
FIG. 6 is another schematic diagram of a location of a second reference signal in a second subframe according to an embodiment of the present disclosure.

In another example in which a subframe includes 14 symbols, the location of the first reference signal in the first subframe and the location of the second reference signal in the second subframe may be respectively shown in FIG. 5 and FIG. 6. FIG. 5 provides an example 2 of a time domain structure of the first subframe. In FIG. 5, a first symbol in the first subframe is a symbol used for downlink control transmission, the first reference signal is carried on some resource elements REs on the third symbol and a fourth symbol in the first subframe, and remaining REs on the third symbol and the fourth symbol may be used to transmit other reference signals or may be used to transmit downlink data. In FIG. 5, two REs that are adjacent in frequency domain and used for the first reference signal may correspond to different antenna ports associated with the first reference signal, a GP occupies a thirteenth symbol in the first subframe, and a fourteenth symbol in the first subframe is used for uplink control transmission. FIG. 6 provides an example 2 of a time domain structure of the second subframe. In FIG. 6, a first symbol in the second subframe is a symbol used for downlink control transmission, the second reference signal is carried on some resource elements REs on the third symbol and a fourth symbol in the second subframe, and remaining REs on the third symbol and the fourth symbol may be used to transmit other reference signals or may be used to transmit uplink data. In FIG. 6, two REs that are adjacent in frequency domain and used for the first reference signal may respectively correspond to different antenna ports of the first reference signal, a GP occupies a second symbol in the second subframe, and optionally, a fourteenth symbol in the second subframe is used for uplink control transmission. As can be seen from the figures, in FIG. 5 and FIG. 6, the location of the first reference signal in the first subframe is the same as the location of the second reference signal in the second subframe.

Further optionally, the first subframe may be a DL dominate subframe (DL dominate subframe or DL centric subframe). Further optionally, the second subframe may be a UL dominate subframe (UL dominate subframe or UL centric subframe), and all symbols in the uplink subframe are used for uplink transmission.

In this embodiment of the present disclosure, the first reference signal may also be referred to as a first demodulation reference signal (DMRS), and the second reference signal may also be referred to as a second demodulation reference signal (DMRS).

In all the embodiments of the present disclosure, the symbol may be a time domain symbol, for example, may be an orthogonal frequency division multiplexing (OFDM) symbol, or may be a single-carrier frequency division multiple access (SC-FDMA) symbol.

203. The user equipment receives the first reference signal based on the location of the first reference signal.

204. The user equipment transmits the second reference signal based on the location of the second reference signal.

In this embodiment, a sequence of step 203 and step 204 is not limited, and a mutual dependency relationship between step 203 and step 204 is not limited either.

In this embodiment, because the location of the first reference signal used for downlink data demodulation is the same as the location (time domain location and/or frequency domain location) of the second reference signal used for uplink data demodulation, uplink-downlink interference estimation can be better performed by using the reference signals, and therefore uplink-downlink interference cancellation can be better performed, so as to better use dynamic TDD, better match an actual service, improve spectrum efficiency of a system, and better provide a low latency service.

In a dynamic TDD mechanism, a transmission direction of a subframe or a transmission unit may dynamically change, that is, the subframe or the transmission unit may be dynamically applied to uplink data transmission or downlink data transmission, so as to better match a current service requirement. For example, if downlink traffic is heavier than uplink traffic in a current service, dynamic TDD may dynamically change most subframes for downlink data transmission. Therefore, the downlink traffic can be better transmitted more quickly, spectrum efficiency of the system is improved, and a latency of a downlink data packet is reduced. However, because the subframe direction may dynamically change, different cells may use different directions in a same subframe or a same transmission unit. Consequently, severe uplink-downlink interference is caused, and dynamic TDD cannot be better applied, or an application scenario of dynamic TDD is limited.

In this embodiment of the present disclosure, the location of the first reference signal is the same as the location of the second reference signal, and sequences of the first reference signal and the second reference signal may be predefined sequences, so that different cells can better perform interference estimation and interference cancellation by using the reference signals. Therefore, uplink-downlink interference is greatly reduced, and performance of dynamic TDD is improved.

On the other hand, in this embodiment of the present disclosure, transmission of self-contained control and pilots is enabled in both the first subframe and the second subframe. To be specific, control corresponding to data of a current subframe may be fed back or transmitted in the current subframe, without depending on other subframes, so that the other subframes may be occupied by a future service anytime, that is, can better support forward compatibility.

Figure 7:
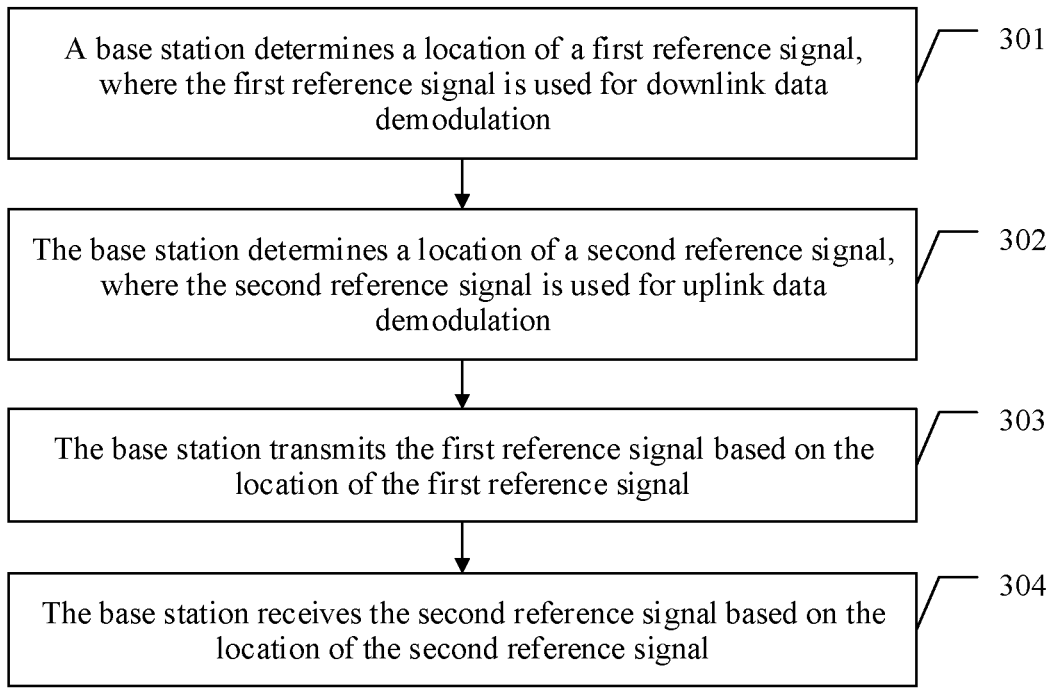
FIG. 7 is a schematic diagram of another embodiment of a method for transmitting and receiving information according to an embodiment of the present disclosure.

2. When the reference signal includes a first reference signal and a second reference signal, and the first device is a base station, referring to FIG. 7, another embodiment of the method for transmitting and receiving information in this embodiment of the present disclosure includes the following steps.

301. A base station determines a location of a first reference signal, where the first reference signal is used for downlink data demodulation.

302. The base station determines a location of a second reference signal, where the second reference signal is used for uplink data demodulation.

In this embodiment, a sequence of step 301 and step 302 is not limited, and a mutual dependency relationship between step 301 and step 302 is not limited either.

It should be noted that, step 301 and step 302 in this embodiment are similar to step 201 and step 202 in the foregoing embodiment, and are not described again in this embodiment.

303. The base station transmits the first reference signal based on the location of the first reference signal.

304. The base station receives the second reference signal based on the location of the second reference signal.

In this embodiment, a sequence of step 303 and step 304 is not limited, and a mutual dependency relationship between step 303 and step 304 is not limited either.

In the foregoing embodiments, the technical solutions of the present disclosure are described mainly from perspectives of a transmission unit and a subframe. The following describes the technical solutions of the present disclosure from a perspective of a structure of a control channel.

Figure 8:
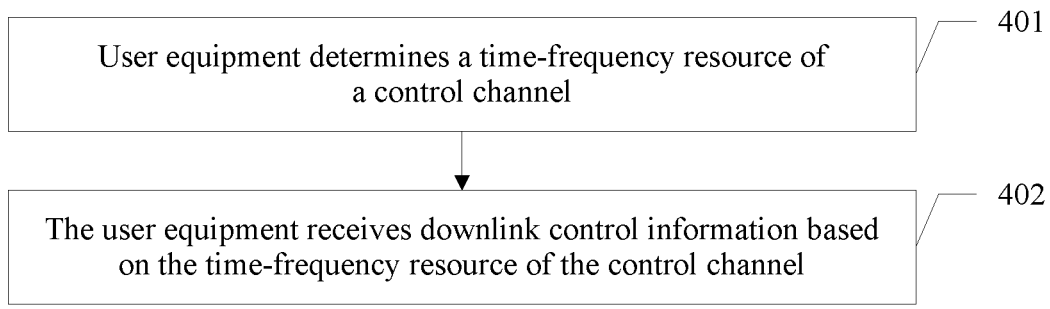
FIG. 8 is a schematic diagram of an embodiment of a method for receiving information according to an embodiment of the present disclosure.

Referring to FIG. 8, an embodiment of a method for receiving information in an embodiment of the present disclosure includes the following steps.

401. User equipment determines a time-frequency resource of a control channel.

402. The user equipment receives downlink control information based on the time-frequency resource of the control channel.

The following describes step 401 and step 402 correspondingly by using some specific implementations. It should be noted that, several implementations provided by the present disclosure are intended for better describing the technical solutions, instead of limiting the technical solutions of the present disclosure. In the present disclosure, other implementations may also be used for corresponding description, and therefore are not limited herein. An implementation of this embodiment of the present disclosure may be as follows:

Optionally, that user equipment determines a time-frequency resource of a control channel includes:

the user equipment determines a time-frequency resource of the control channel in a subframe n; and if the subframe n belongs to a subframe set 1, the user equipment determines the time-frequency resource of the control channel in the subframe n according to a preset rule; or if the subframe n belongs to a subframe set 2, the user equipment determines the time-frequency resource of the control channel in the subframe n according to downlink control signaling; where the subframe set 1 includes a subframe carrying a synchronization signal and/or system information, and the subframe set 2 does not include a subframe carrying a synchronization signal and/or system information; and n is an integer greater than or equal to 0.

Herein the subframe set 1 includes a subframe carrying a synchronization signal and/or system information, and the subframe set 2 does not include a subframe carrying a synchronization signal and/or system information. Specifically, for example, the subframe set 1 may be a subframe carrying a synchronization signal and/or system information, and the subframe set 2 may be other subframes that may carry a downlink control channel, than the subframe carrying the synchronization signal and/or the system information in a radio frame. Herein the system information may be a master information block (Master information Block).

Further optionally, that the user equipment determines the time-frequency resource of the control channel in the subframe n according to downlink control signaling may be: the user equipment determines the time-frequency resource of the control channel in the subframe n according to downlink control signaling carried in a subframe n−k, where k is an integer greater than or equal to 0. For example, if a value of k is equal to 1, the user equipment determines the time-frequency resource of the control channel in the subframe n according to downlink control signaling carried in a subframe n−1. It should be noted that, the subframe n−k may represent a $k^{th}$ subframe, counting from the subframe n, where the subframe n−k and the subframe n may be in a same radio frame or may not be in a same radio frame. When they are not in a same radio frame, the subframe n−k and the subframe n are in two adjacent radio frames. Herein the downlink control signaling may be downlink control information, or information carried in a downlink control information format.

Further optionally, that the user equipment determines the time-frequency resource of the control channel in the subframe n according to a preset rule may be that the time-frequency resource of the control channel in the subframe n occupies two symbols; or may be that the time-frequency resource of the control channel in the subframe n occupies N1 symbols, where N1 is a positive integer greater than or equal to 1 and less than 4; or a quantity of symbols occupied by the time-frequency resource of the control channel in the subframe n may be indicated by using system information, that is, indicated by a MIB.

Obviously, because the control channel resource in the subframe set 1 is determined according to the preset rule, the control channel resource in the subframe set 1 is predefined or fixed, and the user equipment can detect a downlink control channel and complete access in a cell. In addition, in this embodiment of the present disclosure, because the time-frequency resource of the control channel in the subframe set 2 is determined by using the downlink control signaling, the control channel resource in the subframe set 2 can dynamically change. Therefore, control channel resources can be set according to an actual requirement, fixed downlink resources are minimized, dynamic changes of uplink and downlink directions can be applied to more resources, and dynamic TDD can be better used. On the other hand, because the control channel resource in the subframe set 2 is indicated by using the downlink control signaling, forward compatibility can be better supported. For example, when some subframes in the subframe set 2 are dynamically used for future features, downlink control signaling may be used to indicate to legacy user equipment that no downlink control channel resource exists in the subframes, so that new features can be supported while the legacy user equipment can also be compatible.

Further optionally, the control channel includes a control channel set 1, and that user equipment determines a time-frequency resource of a control channel may include:

the user equipment determines a time-frequency resource of the control channel set 1; where the control channel in the control channel set 1 uses a distributed transmission mode.

Herein that the control channel uses a distributed transmission mode may mean that a time-frequency resource occupied by the control channel that is transmitted on the time-frequency resource of the control channel and carries a downlink control information (DCI) format is distributed across the time-frequency resource of the control channel. For example, specifically, a resource element group (REG) corresponding to a control channel carrying a DCI format is distributed across the time-frequency resource of the control channel. Because the control channel is transmitted in distributed mode, more diversity gains can be obtained, and performance of the control channel is improved.

Alternatively, further optionally, the control channel includes a control channel set 1 and a control channel set 2, and that user equipment determines a time-frequency resource of a control channel includes:

the user equipment determines a time-frequency resource of the control channel set 1; and the user equipment determines a time-frequency resource of the control channel set 2; where the control channel in the control channel set 1 uses a distributed transmission mode, and the control channel in the control channel set 2 uses a localized transmission mode.

Herein that the control channel uses a localized transmission mode may mean that a time-frequency resource occupied by the control channel that is transmitted on the time-frequency resource of the control channel and carries a downlink control information (DCI) format is localized on the time-frequency resource of the control channel. For example, specifically, a resource element group (REG) corresponding to a control channel carrying a DCI format is localized on a part of the time-frequency resource of the control channel. Because the control channel is transmitted in localized mode, a beamforming transmission mode can be used, the control channel concentrates on a corresponding beam direction, and coverage of the control channel is improved. In addition, in localized transmission, a user can combine reference signals on localized resources to perform channel estimation, so that performance of channel estimation is improved, and performance of the control channel based on a beam transmission mode is improved.

Further optionally, that the user equipment determines a time-frequency resource of the control channel set 1 may include:

the user equipment detects downlink control information in a subframe n; and the user equipment determines a time-frequency resource of the control channel set 1 in a subframe n+k according to the downlink control information detected in the subframe n, where n is an integer, and k is a positive integer greater than or equal to 1.

Further optionally, the user equipment determines a time-frequency resource of the control channel set 2 in the subframe n+k based on the time-frequency resource of the control channel set 1 in the subframe n+k, where specifically, the user equipment may obtain time-frequency resources of the control channel set 2 by subtracting time-frequency resources of the control channel set 1 from a total of time-frequency resources of the control channel; or further, the user equipment determines a time-frequency resource of the control channel set 2 in the subframe n+k according to the downlink control information detected in the subframe n, where n is an integer, and k is a positive integer greater than or equal to 1.

Further, a subframe carrying the control channel set 2 is not a subframe carrying a synchronization signal and/or system information.

Further optionally, the control channel in the subframe set 1 includes only the control channel set 1, and the control channel in the subframe set 2 may include the control channel set 1 and the control channel set 2; and whether the control channel in the subframe set 2 includes the control channel set 2, and the time-frequency resources of the control channel set 2 may be dynamically indicated.

Further, in this embodiment of the present disclosure, the control channel set 2 is introduced in the subframe set 2 by using dynamic signaling. Because the control channel in the control channel set 2 is transmitted in localized mode, the control channel can be transmitted in beamforming mode, the control channel concentrates on a corresponding beam direction, and coverage of the control channel is improved. In addition, in localized transmission, the user can combine reference signals on localized resources to perform channel estimation, so that performance of channel estimation is improved, and performance of the control channel based on the beam transmission mode is improved.

Another implementation of this embodiment of the present disclosure may be as follows:

Optionally, that user equipment determines a time-frequency resource of a control channel includes:

the user equipment determines a time-frequency resource of a basic set of the control channel;

the user equipment detects the downlink control information based on the time-frequency resource of the basic set; and the user equipment determines a time-frequency resource of an extended set of the control channel according to the detected downlink control information.

Further optionally, that the user equipment determines a time-frequency resource of a basic set of the control channel includes:

the user equipment receives system information; and the user equipment determines the time-frequency resource of the basic set of the control channel according to the system information.

Further optionally, that the user equipment determines the time-frequency resource of the basic set of the control channel according to the system information includes:

the user equipment determines, according to the system information, a quantity of symbols occupied by the time-frequency resource of the basic set of the control channel; or the user equipment determines, according to the system information, a quantity of physical resource block pairs occupied by the time-frequency resource of the basic set of the control channel; or the user equipment determines, according to the system information, a quantity of physical resource blocks occupied by the time-frequency resource of the basic set of the control channel; or the user equipment determines, according to the system information, a quantity of resource blocks occupied by the time-frequency resource of the basic set of the control channel; or the user equipment determines, according to the system information, a quantity of subcarriers occupied by the time-frequency resource of the basic set of the control channel; or the user equipment determines, according to the system information, a quantity of control channel elements CCEs corresponding to the time-frequency resource of the basic set of the control channel.

Alternatively, further optionally, that the user equipment determines a time-frequency resource of a basic set of the control channel includes:

the user equipment determines the time-frequency resource of the basic set of the control channel according to a preset rule.

The preset rule may be that the time-frequency resource of the basic set of the control channel occupies one symbol.

Alternatively, further optionally, that the user equipment determines a time-frequency resource of a basic set of the control channel includes:

the user equipment receives system information;

the user equipment determines, according to the system information, a quantity of physical resource block pairs occupied by the time-frequency resource of the basic set of the control channel, or the user equipment determines, according to the system information, a quantity of physical resource blocks occupied by the time-frequency resource of the basic set of the control channel, or the user equipment determines, according to the system information, a quantity of resource blocks occupied by the time-frequency resource of the basic set of the control channel, or the user equipment determines, according to the system information, a quantity of subcarriers occupied by the time-frequency resource of the basic set of the control channel, or a quantity of control channel elements corresponding to the time-frequency resource of the basic set of the control channel; and the user equipment determines, according to a predefined rule, a quantity of symbols occupied by the time-frequency resource of the control channel, where the predefined rule may be that the quantity of the symbols occupied by the time-frequency resource of the control channel is a fixed value, or that the quantity of the symbols occupied by the time-frequency resource of the control channel is a preset value, for example, 2 symbols.

Further optionally, that the user equipment detects the downlink control information based on the time-frequency resource of the basic set, and that the user equipment determines a time-frequency resource of an extended set of the control channel according to the detected downlink control information include:

the user equipment detects the downlink control information based on the time-frequency resource of the basic set in a subframe n; and the user equipment determines a time-frequency resource of the extended set of the control channel in a subframe n+k according to the downlink control information detected in the subframe n, where n is an integer, and k is a positive integer greater than or equal to 0. For example, a value of k is equal to 1.

Further, the method further includes:

the user equipment determines, according to the detected downlink control information, whether the extended set of the control channel exists; or the user equipment determines, according to the detected downlink control information, a transmission mode corresponding to the extended set of the control channel. For example, the transmission mode corresponding to the extended set is dynamically indicated as a localized transmission mode or a distributed transmission mode.

Further optionally, the basic set exists in all subframes including symbols used for downlink transmission.

Further optionally, the extended set does not exist in a subframe carrying a synchronization signal and/or system information.

Obviously, the time-frequency resource of the basic set of the control channel is determined according to the preset rule, the downlink control information is detected based on the time-frequency resource of the basic set, and the time-frequency resource of the extended set of the control channel is determined according to the detected downlink control information. Therefore, fixed downlink resources are minimized and used as time-frequency resources of the basic set, and dynamic TDD can be better used. On the other hand, because the resource in the extended set is dynamically indicated, forward compatibility can be better supported. For example, when some subframes in a subframe set 2 are dynamically used for future features, that no downlink control channel resource in the extended set exists in the subframes may be dynamically indicated to legacy user equipment, so that new features can be supported while the legacy user equipment can also be compatible.

Further, in this embodiment of the present disclosure, because the transmission mode of the extended set is indicated by using dynamic signaling, the transmission mode of the control channel can be better matched. For example, when the extended control channel is mainly used for common control signaling, the transmission mode of the extended set may be indicated as the distributed mode; or when the extended set signaling is mainly used for user equipment dedicated signaling, the localized transmission mode may be indicated, so that the transmission mode of the control channel is better matched.

Another implementation of this embodiment of the present disclosure may be as follows:

That user equipment determines a time-frequency resource of a control channel may be: the user equipment determines a time-frequency resource of a first control channel; and the user equipment determines a time-frequency resource of a second control channel.

Optionally, that the user equipment determines a time-frequency resource of a first control channel may be: the user equipment determines a time-frequency resource of the first control channel in a subframe n; and if the subframe n belongs to a subframe set 1, the user equipment determines the time-frequency resource of the first control channel in the subframe n according to a preset rule; or if the subframe n belongs to a subframe set 2, the user equipment determines the time-frequency resource of the first control channel in the subframe n according to downlink control signaling; where the subframe set 1 includes a subframe carrying a synchronization signal and/or system information, and the subframe set 2 does not include a subframe carrying a synchronization signal and/or system information; and n is an integer greater than or equal to 0.

Further optionally, that the user equipment determines the time-frequency resource of the first control channel in the subframe n according to downlink control signaling includes:

the user equipment determines the time-frequency resource of the first control channel in the subframe n according to downlink control signaling carried in a subframe n−k, where k is an integer greater than or equal to 0.

Alternatively, further optionally, that the user equipment determines the time-frequency resource of the first control channel in the subframe n according to downlink control signaling includes:

the user equipment determines the time-frequency resource of the first control channel in the subframe n according to downlink control signaling carried in a subframe n−1.

Alternatively, further optionally, that the user equipment determines the time-frequency resource of the first control channel in the subframe n according to a preset rule includes:

the time-frequency resource of the first control channel in the subframe n occupies two symbols in time domain.

Optionally, the first control channel includes a first control channel set 1, and that the user equipment determines a time-frequency resource of a first control channel includes:

the user equipment determines a time-frequency resource of the first control channel set 1;

where the first control channel in the first control channel set 1 uses a distributed transmission mode.

Herein that the first control channel uses a distributed transmission mode may mean that a time-frequency resource occupied by the first control channel that is transmitted on the time-frequency resource of the first control channel and carries a downlink control information (DCI) format is distributed across the time-frequency resource of the control channel. For example, specifically, a resource element group (REG) corresponding to a control channel carrying a DCI format is distributed across the time-frequency resource of the control channel. Because the control channel is transmitted in distributed mode, more diversity gains can be obtained, and performance of the control channel is improved.

Alternatively, optionally, the first control channel includes a first control channel set 1 and a first control channel set 2, and that the user equipment determines a time-frequency resource of a first control channel includes:

the user equipment determines a time-frequency resource of the first control channel set 1; and the user equipment determines a time-frequency resource of the first control channel set 2; where the first control channel in the first control channel set 1 uses a distributed transmission mode, and the first control channel in the first control channel set 2 uses a localized transmission mode.

Herein that the first control channel uses a localized transmission mode may mean that a time-frequency resource occupied by the control channel that is transmitted on the time-frequency resource of the control channel and carries a downlink control information (DCI) format is localized on the time-frequency resource of the control channel. For example, specifically, a resource element group (REG) corresponding to a control channel carrying a DCI format is localized on a part of the time-frequency resource of the control channel. Because the control channel is transmitted in localized mode, a beamforming transmission mode can be used, the first control channel concentrates on a corresponding beam direction, and coverage of the first control channel is improved. In addition, in localized transmission, a user can combine reference signals on localized resources to perform channel estimation, so that performance of channel estimation is improved, and performance of the first control channel based on a beam transmission mode is improved.

Further optionally, that the user equipment determines a time-frequency resource of the first control channel set 1 includes:

the user equipment detects downlink control information in a subframe n; and the user equipment determines a time-frequency resource of the first control channel set 1 in a subframe n+k according to the downlink control information detected in the subframe n, where n is an integer, and k is a positive integer greater than or equal to 1.

Further optionally, the method further includes:

the user equipment determines a time-frequency resource of the first control channel set 2 in the subframe n+k based on the time-frequency resource of the first control channel set 1 in the subframe n+k.

Further optionally, a subframe carrying the first control channel does not carry a synchronization signal and/or system information.

It should be noted that, this implementation is also applicable to a first control channel in a two-level control channel in a two-level control channel manner hereinafter.

Another implementation of this embodiment of the present disclosure may be as follows:

That user equipment determines a time-frequency resource of a control channel may be: the user equipment determines a time-frequency resource of a first control channel; and the user equipment determines a time-frequency resource of a second control channel.

Optionally, that the user equipment determines a time-frequency resource of a first control channel may be: the user equipment determines a time-frequency resource of a basic set of the first control channel;

the user equipment detects the downlink control information based on the time-frequency resource of the basic set; and the user equipment determines a time-frequency resource of an extended set of the first control channel according to the detected downlink control information.

Further optionally, that the user equipment determines a time-frequency resource of a basic set of the first control channel includes:

the user equipment receives system information; and the user equipment determines the time-frequency resource of the basic set of the first control channel according to the system information.

Alternatively, further optionally, that the user equipment determines the time-frequency resource of the basic set of the first control channel according to the system information includes:

the user equipment determines, according to the system information, a quantity of symbols occupied by the time-frequency resource of the basic set of the first control channel; or the user equipment determines, according to the system information, a quantity of physical resource block pairs occupied by the time-frequency resource of the basic set of the first control channel; or the user equipment determines, according to the system information, a quantity of physical resource blocks occupied by the time-frequency resource of the basic set of the first control channel; or the user equipment determines, according to the system information, a quantity of resource blocks occupied by the time-frequency resource of the basic set of the first control channel; or the user equipment determines, according to the system information, a quantity of subcarriers occupied by the time-frequency resource of the basic set of the first control channel; or the user equipment determines, according to the system information, a quantity of control channel elements (CCE) corresponding to the time-frequency resource of the basic set of the first control channel.

Alternatively, further optionally, that the user equipment determines a time-frequency resource of a basic set of the first control channel includes:

the user equipment determines the time-frequency resource of the basic set of the first control channel according to a preset rule.

Further optionally, the preset rule may be that the time-frequency resource of the basic set of the first control channel occupies one symbol.

Optionally, that the user equipment determines a time-frequency resource of a basic set of the first control channel includes:

the user equipment receives system information;

the user equipment determines, according to the system information, a quantity of physical resource block pairs occupied by the time-frequency resource of the basic set of the first control channel or a quantity of physical resource blocks occupied by the time-frequency resource of the basic set of the first control channel or a quantity of resource blocks occupied by the time-frequency resource of the basic set of the first control channel or a quantity of subcarriers occupied by the time-frequency resource of the basic set of the first control channel or a quantity of control channel elements corresponding to the time-frequency resource of the basic set of the first control channel; and the user equipment determines, according to a predefined rule, a quantity of symbols occupied by the time-frequency resource of the first control channel. The predefined rule may be that the quantity of the symbols occupied by the time-frequency resource of the control channel is a fixed value, or that the quantity of the symbols occupied by the time-frequency resource of the control channel is a preset value, for example, 2 symbols.

Optionally, that the user equipment detects the downlink control information based on the time-frequency resource of the basic set, and that the user equipment determines a time-frequency resource of an extended set of the first control channel according to the detected downlink control information include:

the user equipment detects the downlink control information based on the time-frequency resource of the basic set in a subframe n; and the user equipment determines a time-frequency resource of the extended set of the first control channel in a subframe n+k according to the downlink control information detected in the subframe n, where n is an integer, and k is a positive integer greater than or equal to 0. For example, a value of k is equal to 1.

Optionally, the method further includes:

the user equipment determines, according to the detected downlink control information, whether the extended set of the first control channel exists; or the user equipment determines, according to the detected downlink control information, a transmission mode corresponding to the extended set of the first control channel.

Optionally, the basic set exists in all subframes including symbols used for downlink transmission.

Optionally, the extended set does not exist in a subframe carrying a synchronization signal and/or system information.

It should be noted that, this implementation is also applicable to a first control channel in a two-level control channel in a two-level control channel manner hereinafter.

Another implementation of this embodiment of the present disclosure may be a two-level control channel manner:

That user equipment determines a time-frequency resource of a control channel, and that the user equipment receives downlink control information based on the time-frequency resource of the control channel may specifically include:

the user equipment determines a time-frequency resource of a first control channel;

the user equipment determines a time-frequency resource of a second control channel;

the user equipment detects first downlink control information based on the time-frequency resource of the first control channel; and the user equipment detects second downlink control information based on the time-frequency resource of the second control channel.

Further optionally, a symbol occupied by the time-frequency resource of the first control channel is located before a symbol occupied by the time-frequency resource of the second control channel.

Further optionally, the time-frequency resource of the first control channel occupies i symbols, corresponding to symbols $l_0, \ldots, l_{i-1}$, where i is a positive integer greater than or equal to 1; the time-frequency resource of the second control channel starts with a symbol $l_{i+k}$, where k is a positive integer greater than or equal to 1; and a symbol $l_i$ to a symbol $l_{i+k-1}$ are used to transmit a reference signal, where the reference signal is used to demodulate the second control channel and/or data; or the time-frequency resource of the first control channel occupies i symbols, corresponding to symbols $l_0, \ldots, l_{i-1}$, where i is a positive integer greater than or equal to 1; the time-frequency resource of the second control channel starts with a symbol $l_{i+k}$, or the time-frequency resource of the second control channel is located on a symbol after the symbol $l_{i-1}$; and the second control channel and downlink data are multiplexed on a time-frequency resource corresponding to the symbol after the symbol $l_{i-1}$.

Herein the first control channel, the second control channel, and the reference signal used to demodulate the second control channel and/or data are placed ahead, so that detection can be performed quickly and that a latency can be reduced. Further, the reference signal used to demodulate the second control channel and/or data is placed after the first control channel and before the second control channel, so that the second control channel and data can be detected quickly. The second control channel and data are multiplexed, so that multiplexing efficiency can be improved and that spectrum efficiency is improved.

Optionally, that the user equipment determines a time-frequency resource of a first control channel, and that the user equipment determines a time-frequency resource of a second control channel include:

the user equipment determines a time-frequency resource of the first control channel in a first subframe; and the user equipment determines a time-frequency resource of the second control channel in the first subframe; where the first subframe includes a symbol used for downlink transmission, a guard period (GP), and a symbol used for uplink transmission, uplink transmission corresponding to a symbol included in the first subframe and used for uplink transmission includes hybrid automatic repeat request-acknowledgment (HARQ-ACK) transmission, and downlink transmission corresponding to a symbol included in the first subframe and used for downlink transmission includes downlink control transmission, downlink data transmission, and transmission of a first reference signal; and symbols included in the first subframe and used for downlink transmission include a symbol occupied by the time-frequency resource of the first control channel and a symbol occupied by the time-frequency resource of the second control channel.

Further optionally, the time-frequency resource of the first control channel occupies i symbols in the first subframe, corresponding to a first symbol to an $i^{th}$ symbol in the first subframe, where i is a positive integer greater than or equal to 1; the time-frequency resource of the second control channel starts with an $(i+k+1)^{th}$ symbol in the first subframe, where k is a positive integer greater than or equal to 1; an $(i+1)^{th}$ symbol to an $(i+k)^{th}$ symbol in the first subframe are used to transmit a reference signal, where the reference signal is used to demodulate the second control channel and/or data; and an $(1-k1)^{th}$ symbol to an $l^{th}$ symbol in the first subframe are symbols used for uplink transmission in the first subframe, where l is a quantity of symbols included in the first subframe, and k1 is a positive integer greater than or equal to 1; or the time-frequency resource of the first control channel occupies i symbols in the first subframe, corresponding to a first symbol to an $i^{th}$ symbol in the first subframe, where i is a positive integer greater than or equal to 1; the time-frequency resource of the second control channel starts with an $(i+1)^{th}$ symbol in the first subframe, or the time-frequency resource of the second control channel is located on a symbol after the $i^{th}$ symbol in the first subframe; the second control channel and downlink data are multiplexed on time-frequency resources corresponding to the $i^{th}$ symbol in the first subframe to an $(i+k2)^{th}$ symbol in the first subframe, where k2 is a positive integer greater than 1; an $(i+k2+1)^{th}$ symbol in the first subframe is a guard period GP in the first subframe; and an $(i+k2+2)^{th}$ symbol to an $i^{th}$ symbol in the first subframe are symbols used for uplink transmission in the first subframe, where l is a quantity of symbols included in the first subframe.

The first control channel, the second control channel, and the reference signal used to demodulate the second control channel and/or data are placed ahead in the first subframe, so that detection can be performed quickly and that a latency can be reduced. Further, the reference signal used to demodulate the second control channel and/or data is placed after the first control channel and before the second control channel in the first subframe, so that the second control channel and data can be detected quickly. The second control channel and data are multiplexed, so that multiplexing efficiency can be improved and that spectrum efficiency is improved. A design of the first subframe enables transmission of self-contained control and a pilot. To be specific, control corresponding to data of a current subframe may be fed back or transmitted in the current subframe, without depending on other subframes, so that the other subframes may be occupied by a future service anytime, that is, can better support forward compatibility.

Optionally, that the user equipment determines a time-frequency resource of a first control channel, and that the user equipment determines a time-frequency resource of a second control channel include:

the user equipment determines a time-frequency resource of the first control channel in a second subframe; and the user equipment determines that no time-frequency resource of the second control channel exists in the second subframe; where the second subframe includes a symbol used for downlink transmission, a guard period (GP), and a symbol used for uplink transmission, downlink transmission corresponding to a symbol included in the second subframe and used for downlink transmission includes downlink control transmission, and uplink transmission corresponding to a symbol included in the second subframe and used for uplink transmission includes transmission of a second reference signal, uplink data transmission, and uplink control transmission.

Further, a symbol included in the second subframe and used for downlink transmission is a first symbol in the second subframe, and the time-frequency resource of the first control channel occupies the first symbol in the second subframe.

Herein the second subframe is mainly used for uplink data transmission, and includes the first control channel, and scheduling of self-contained uplink data is enabled. To be specific, uplink data transmission of the subframe is scheduled by using the first downlink control channel, so that transmission of self-contained control and a pilot is enabled. To be specific, control corresponding to data of a current subframe may be fed back or transmitted in the current subframe, without depending on other subframes, so that the other subframes may be occupied by a future service anytime, that is, can better support forward compatibility.

Further optionally, that the user equipment determines a time-frequency resource of a second control channel includes:

the user equipment determines the time-frequency resource of the second control channel according to the first downlink control information.

Further optionally, the first downlink control information is carried in a subframe n, and the second control channel is carried in the subframe n; or the first downlink control information is carried in a subframe n, and the second control channel is carried in a subframe n+1; where n is a positive integer. For example, k is equal to 1.

Because the time-frequency resource of the second control channel is indicated by using the first downlink control information, the control channel resource can dynamically change. Therefore, control channel resources can be set according to an actual requirement, fixed downlink resources are minimized, dynamic changes of uplink and downlink directions can be applied to more resources, and dynamic TDD can be better used. On the other hand, when a second control channel resource in a subframe n+k is indicated by using the first downlink control information in the subframe n, the second control channel resource is dynamically indicated, and therefore forward compatibility can be better supported. For example, when the subframe n+k is used for future features, downlink control signaling may be used to indicate to legacy user equipment that no second downlink control channel resource exists in the subframe, so that new features can be supported while the legacy user equipment can also be compatible.

Optionally, the method further includes:

the user equipment receives a downlink shared channel according to the first downlink control information and the second downlink control information; where the first downlink control information includes information about the time-frequency resource of the second downlink control channel and/or information about a time-frequency resource of the downlink shared channel; and the second downlink control information includes modulation and coding information of the downlink shared channel.

The second control channel resource is indicated by using the first control channel, and the first control information and the second control information jointly schedule the downlink shared channel. Therefore, a low-latency service can be scheduled in a short transmission time unit or a short transmission time interval, and control channel overheads in the short transmission time unit or the short transmission time interval can be reduced while the low-latency service is scheduled quickly.

Further optionally, the first control channel is demodulated only according to a reference signal carried on the time-frequency resource of the first control channel. The self-contained first control channel is enabled, so that demodulation of the first control channel does not depend on other resources. This helps support forward compatibility.

With reference to the descriptions of the first control channel implemented in the foregoing implementations, it can be known that, because the first control channel resource in the subframe set 1 is determined according to the preset rule, the control channel resource in the subframe set 1 is predefined or fixed, and the user equipment can detect a downlink control channel and complete access in a cell. In addition, in this embodiment of the present disclosure, because the time-frequency resource of the first control channel in the subframe set 2 is determined by using the downlink control signaling, the first control channel resource in the subframe set 2 can dynamically change. Therefore, control channel resources can be set according to an actual requirement, fixed downlink resources are minimized, dynamic changes of uplink and downlink directions can be applied to more resources, and dynamic TDD can be better used. On the other hand, because the first control channel resource in the subframe set 2 is indicated by using the downlink control signaling, forward compatibility can be better supported. For example, when some subframes in the subframe set 2 are dynamically used for future features, downlink control signaling may be used to indicate to legacy user equipment that no first downlink control channel resource exists in the subframes, so that new features can be supported while the legacy user equipment can also be compatible.

The time-frequency resource of the basic set of the first control channel is determined according to the preset rule, the downlink control information is detected based on the time-frequency resource of the basic set, and the time-frequency resource of the extended set of the first control channel is determined according to the detected downlink control information. Therefore, fixed downlink resources are minimized and used as time-frequency resources of the basic set, and dynamic TDD can be better used. On the other hand, because the resource in the extended set is dynamically indicated, forward compatibility can be better supported. For example, when some subframes in the subframe set 2 are dynamically used for future features, that no downlink control channel resource in the extended set exists in the subframes may be dynamically indicated to legacy user equipment, so that new features can be supported while the legacy user equipment can also be compatible.

Further, because the transmission mode of the extended set is indicated by using dynamic signaling, the transmission mode of the control channel can be better matched. For example, when the extended control channel is mainly used for common control signaling, the transmission mode of the extended set may be indicated as the distributed mode; or when the extended set signaling is mainly used for user equipment dedicated signaling, the localized transmission mode may be indicated, so that the transmission mode of the control channel is better matched.

Figure 9:
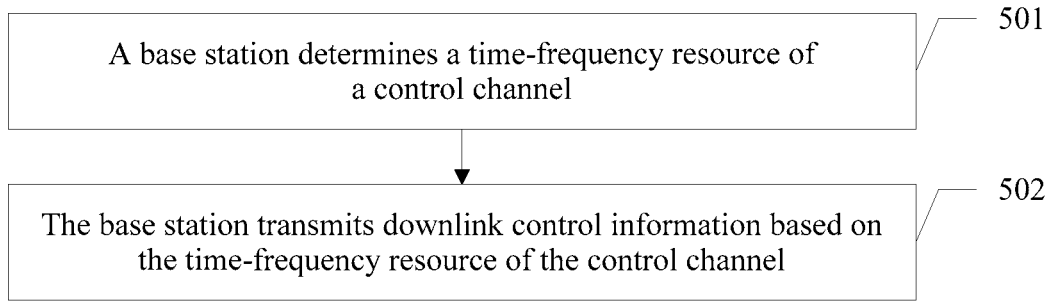
FIG. 9 is a schematic diagram of an embodiment of a method for transmitting information according to an embodiment of the present disclosure.

Referring to FIG. 9, an embodiment of a method for transmitting information in an embodiment of the present disclosure includes the following steps.

501. A base station determines a time-frequency resource of a control channel.

502. The base station transmits downlink control information based on the time-frequency resource of the control channel.

The following describes step 501 and step 502 correspondingly by using some specific implementations. It should be noted that, several implementations provided by the present disclosure are intended for better describing the technical solutions, instead of limiting the technical solutions of the present disclosure. In the present disclosure, other implementations may also be used for corresponding description, and therefore are not limited herein. An implementation of this embodiment of the present disclosure may be as follows:

Optionally, that a base station determines a time-frequency resource of a control channel includes:

the base station transmits downlink control signaling, where the downlink control signaling is used to determine a time-frequency resource of the control channel in a subframe n, the subframe n does not carry a synchronization signal and/or system information, and n is an integer greater than or equal to 0.

Further optionally, that the base station transmits downlink control signaling includes:

the base station transmits the downlink control signaling in a subframe n–k, where k is an integer greater than or equal to 0. For example, k is equal to 1.

Further optionally, that a base station determines a time-frequency resource of a control channel includes:

the base station determines a time-frequency resource of the control channel in a subframe n according to a predefined rule, where the predefined rule may be that a quantity of symbols occupied by the time-frequency resource of the control channel is a fixed value, or that a quantity of symbols occupied by the time-frequency resource of the control channel is a preset value, for example, 2 symbols.

The subframe n may belong to a subframe set 1, and the subframe set 1 includes a subframe carrying a synchronization signal and/or system information.

Further, that the base station determines a time-frequency resource of the control channel in a subframe n according to a preset rule may be that the time-frequency resource of the control channel in the subframe n occupies two symbols; or may be that the time-frequency resource of the control channel in the subframe n occupies N1 symbols, where N1 is a positive integer greater than or equal to 1 and less than or equal to 4.

Further optionally, the control channel includes a control channel set 1, and that a base station determines a time-frequency resource of a control channel may include:

the base station determines a time-frequency resource of the control channel set 1; and the base station transmits the control channel based on the time-frequency resource of the control channel set 1 by using a distributed transmission mode.

Herein that the control channel uses a distributed transmission mode may mean that a time-frequency resource occupied by the control channel that is transmitted on the time-frequency resource of the control channel and carries a DCI format is distributed across the time-frequency resource of the control channel. For example, specifically, a resource element group (REG) corresponding to a control channel carrying a downlink control information DCI format is distributed across the time-frequency resource of the control channel. Because the control channel is transmitted in distributed mode, more diversity gains can be obtained, and performance of the control channel is improved.

Alternatively, further optionally, the control channel includes a control channel set 1 and a control channel set 2, and that a base station determines a time-frequency resource of a control channel includes:

the base station determines a time-frequency resource of the control channel set 1; and the base station determines a time-frequency resource of the control channel set 2; where the control channel in the control channel set 1 uses a distributed transmission mode, and the control channel in the control channel set 2 uses a localized transmission mode.

Herein that the control channel uses a localized transmission mode may mean that a time-frequency resource occupied by the control channel that is transmitted on the time-frequency resource of the control channel and carries a DCI format is localized on the time-frequency resource of the control channel. For example, specifically, a resource element group (REG) corresponding to a control channel carrying a DCI format is localized on a part of the time-frequency resource of the control channel. Because the control channel is transmitted in localized mode, a beamforming transmission mode can be used, the control channel concentrates on a corresponding beam direction, and coverage of the control channel is improved. In addition, in localized transmission, a user can combine reference signals on localized resources to perform channel estimation, so that performance of channel estimation is improved, and performance of the control channel based on a beam transmission mode is improved.

Another implementation of this embodiment of the present disclosure may be as follows:

In this step, that a base station determines a time-frequency resource of a control channel may further include:

the base station determines a time-frequency resource of a basic set of the control channel; and the base station transmits the downlink control information based on the time-frequency resource of the basic set, where the downlink control information includes information about a time-frequency resource of an extended set of the control channel.

Further optionally, the method further includes:

the base station transmits system information, where the system information includes information about the time-frequency resource of the basic set of the control channel.

Further optionally, that the system information includes information about the time-frequency resource of the basic set of the control channel includes:

the system information includes information about a quantity of symbols occupied by the time-frequency resource of the basic set of the control channel; or the system information includes information about a quantity of physical resource block pairs occupied by the time-frequency resource of the basic set of the control channel; or the system information includes information about a quantity of physical resource blocks occupied by the time-frequency resource of the basic set of the control channel; or the system information includes information about a quantity of resource blocks occupied by the time-frequency resource of the basic set of the control channel; or the system information includes information about a quantity of subcarriers occupied by the time-frequency resource of the basic set of the control channel; or the system information includes information about a quantity of control channel elements (CCE) corresponding to the time-frequency resource of the basic set of the control channel.

Further optionally, that the base station determines a time-frequency resource of a basic set of the control channel includes:

the base station determines the time-frequency resource of the basic set of the control channel according to a preset rule.

Further optionally, the preset rule may be that the time-frequency resource of the basic set of the control channel occupies one symbol.

Further optionally, that the base station transmits the downlink control information based on the time-frequency resource of the basic set, where the downlink control information includes information about a time-frequency resource of an extended set of the control channel, includes:

the base station transmits the downlink control information based on the time-frequency resource of the basic set in a subframe n, where the downlink control information includes information about a time-frequency resource of the extended set of the control channel in a subframe n+k, where n is an integer, and k is a positive integer greater than or equal to 0. For example, a value of k is equal to 1.

Optionally, the method further includes:

the downlink control information includes information indicating that the extended set of the control channel exists; or the downlink control information includes information indicating a transmission mode corresponding to the extended set of the control channel.

Optionally, the basic set exists in all subframes including symbols used for downlink transmission.

Optionally, the extended set does not exist in a subframe carrying a synchronization signal and/or system information.

Another implementation of this embodiment of the present disclosure may be as follows:

In this step, that a base station determines a time-frequency resource of a control channel may further include:

the base station transmits downlink control signaling, where the downlink control signaling is used to determine a time-frequency resource of a first control channel in a subframe n, the subframe n does not carry a synchronization signal and/or system information, and n is an integer greater than or equal to 0.

Optionally, that the base station transmits downlink control signaling includes:

the base station transmits the downlink control signaling in a subframe n−k, where k is an integer greater than or equal to 0. For example, k is equal to 1.

Optionally, that the base station determines a time-frequency resource of a first control channel includes:

the base station determines a time-frequency resource of the first control channel in a subframe n according to a predefined rule, where the subframe n carries a synchronization signal and/or system information.

Alternatively, optionally, the first control channel includes a first control channel set 1, and that the base station determines a time-frequency resource of a first control channel includes:

the base station determines a time-frequency resource of the first control channel set 1; and the base station transmits the first control channel based on the time-frequency resource of the first control channel set 1 by using a distributed transmission mode.

Herein that the first control channel uses a distributed transmission mode may mean that a time-frequency resource occupied by the first control channel that is transmitted on the time-frequency resource of the first control channel and carries a DCI format is distributed across the time-frequency resource of the control channel. For example, specifically, a resource element group (REG) corresponding to a control channel carrying a DCI format is distributed across the time-frequency resource of the control channel. Because the control channel is transmitted in distributed mode, more diversity gains can be obtained, and performance of the first control channel is improved.

Alternatively, optionally, the first control channel includes a first control channel set 1 and a first control channel set 2, and that the base station determines a time-frequency resource of a first control channel includes:

the base station determines a time-frequency resource of the first control channel set 1; and the base station determines a time-frequency resource of the first control channel set 2; where the first control channel in the first control channel set 1 uses a distributed transmission mode, and the first control channel in the first control channel set 2 uses a localized transmission mode.

Herein that the first control channel uses a localized transmission mode may mean that a time-frequency resource occupied by the first control channel that is transmitted on the time-frequency resource of the control channel and carries a DCI format is localized on the time-frequency resource of the control channel. For example, specifically, a resource element group (REG) corresponding to a control channel carrying a DCI format is localized on a part of the time-frequency resource of the control channel. Because the control channel is transmitted in localized mode, a beamforming transmission mode can be used, the control channel concentrates on a corresponding beam direction, and coverage of the control channel is improved. In addition, in localized transmission, a user can combine reference signals on localized resources to perform channel estimation, so that performance of channel estimation is improved, and performance of the first control channel based on a beam transmission mode is improved.

Further, the method further includes:

the base station transmits downlink control information in a subframe n, where the downlink control information includes information about a time-frequency resource of the first control channel set 1 in a subframe n+k, n is an integer, and k is a positive integer greater than or equal to 1.

Figure 10:
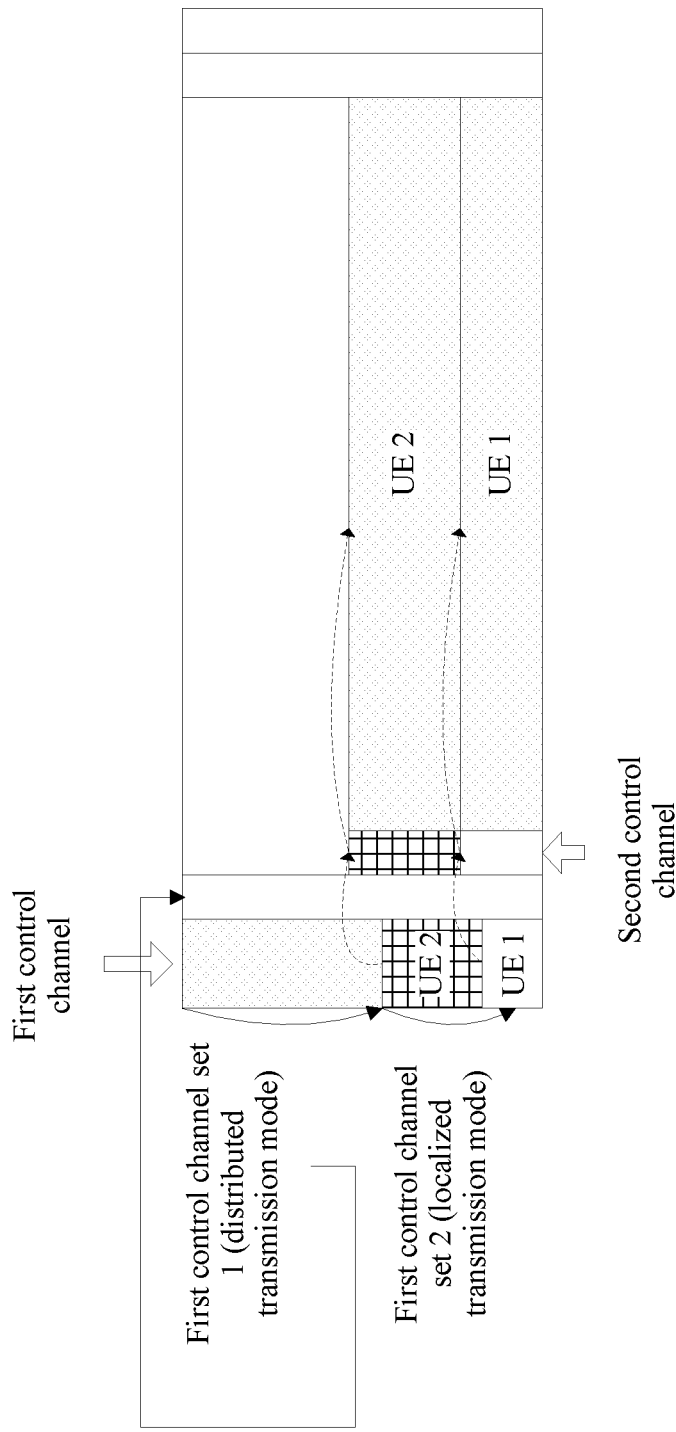
FIG. 10 is a schematic structural diagram of a first subframe in time domain according to an embodiment of the disclosure.

FIG. 10 provides a specific instance. In FIG. 10, a time-frequency resource of a first control channel occupies i symbols in a first subframe, corresponding to a first symbol to an $i^{th}$ symbol in the first subframe, where i is a positive integer greater than or equal to 1 and i is equal to 2; the first control channel includes a first control channel set 1 (using a distributed transmission mode) and a first control channel set 2 (using a localized transmission mode); a third symbol in the first subframe is used to transmit a reference signal, where the reference signal is used to demodulate a second control channel and/or data; a time-frequency resource of the second control channel starts with a fourth symbol in the first subframe; a thirteenth symbol in the first subframe is used as a GP; and a fourteenth symbol in the first subframe is used for uplink transmission. In FIG. 10, the first control channel corresponding to UE 1 indicates a second control channel resource corresponding to the UE 1; the second control channel corresponding to the UE 1 schedules a downlink shared channel of the UE 1 to transmit data; both the first control channel and the second control channel corresponding to the UE 1 and UE 2 may use a beam-based transmission mode; and the first control channel corresponding to the UE 1 uses a localized transmission mode.

Another implementation of this embodiment of the present disclosure may be as follows:

In this step, that a base station determines a time-frequency resource of a control channel may further include:

the base station determines a time-frequency resource of a first control channel.

Further, that the base station determines a time-frequency resource of a first control channel includes:

the base station determines a time-frequency resource of a basic set of the first control channel; and the base station transmits the downlink control information based on the time-frequency resource of the basic set, where the downlink control information includes information about a time-frequency resource of an extended set of the first control channel.

Optionally, the method further includes:

the base station transmits system information, where the system information includes information about the time-frequency resource of the basic set of the first control channel.

Further, that the system information includes information about the time-frequency resource of the basic set of the first control channel is specifically:

the system information includes information about a quantity of symbols occupied by the time-frequency resource of the basic set of the first control channel; or the system information includes information about a quantity of physical resource block pairs occupied by the time-frequency resource of the basic set of the first control channel; or the system information includes information about a quantity of physical resource blocks occupied by the time-frequency resource of the basic set of the first control channel; or the system information includes information about a quantity of resource blocks occupied by the time-frequency resource of the basic set of the first control channel; or the system information includes information about a quantity of subcarriers occupied by the time-frequency resource of the basic set of the first control channel; or the system information includes information about a quantity of control channel elements (CCE) corresponding to the time-frequency resource of the basic set of the first control channel.

Optionally, that the base station determines a time-frequency resource of a basic set of the control channel includes:

the base station determines the time-frequency resource of the basic set of the first control channel according to a preset rule.

Further, the preset rule is that the time-frequency resource of the basic set of the first control channel occupies one symbol.

Optionally, that the base station transmits the downlink control information based on the time-frequency resource of the basic set, where the downlink control information includes information about a time-frequency resource of an extended set of the first control channel, includes:

the base station transmits the downlink control information based on the time-frequency resource of the basic set in a subframe n, where the downlink control information includes information about a time-frequency resource of the extended set of the first control channel in a subframe n+k, where n is an integer, and k is a positive integer greater than or equal to 0. For example, a value of k is equal to 1.

Optionally, the method further includes:

the downlink control information includes information indicating that the extended set of the first control channel exists; or the downlink control information includes information indicating a transmission mode corresponding to the extended set of the first control channel.

Optionally, the basic set exists in all subframes including symbols used for downlink transmission.

Optionally, the extended set does not exist in a subframe carrying a synchronization signal and/or system information.

Figure 11:
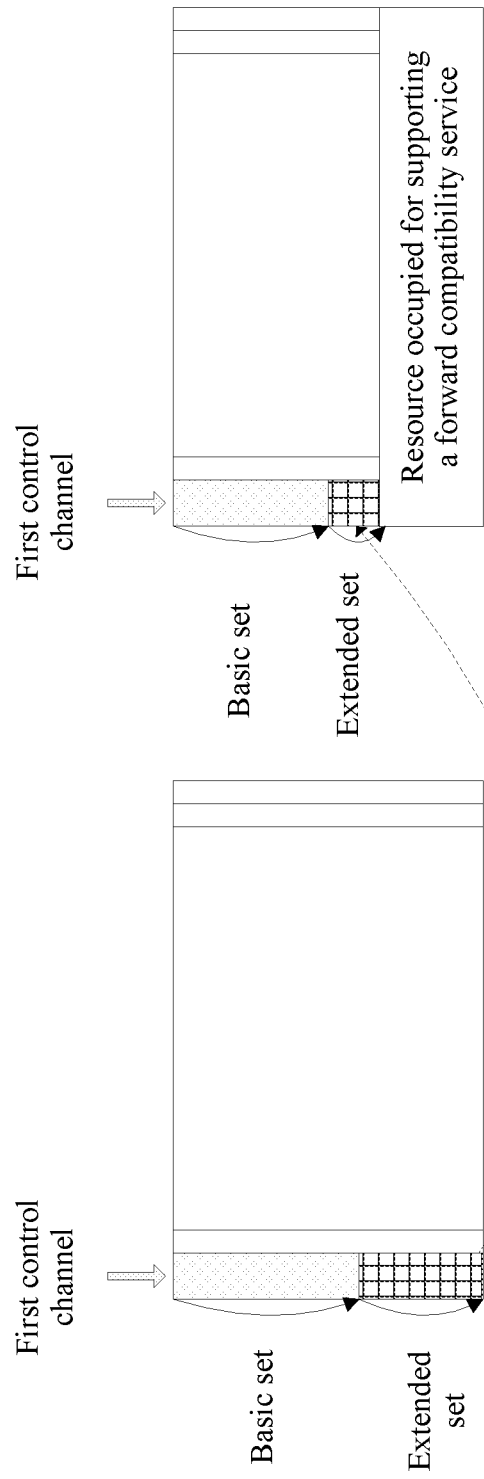
FIG. 11 is another schematic structural diagram of a first subframe in time domain according to an embodiment of the disclosure.

FIG. 11 provides a specific instance. In FIG. 11, a time-frequency resource of a first control channel occupies i symbols in a first subframe, corresponding to a first symbol to an $i^{th}$ symbol in the first subframe, where i is a positive integer greater than or equal to 1 and i is equal to 2; the first control channel includes a basic set of the first control channel and an extended set of the first control channel, where a resource in the extended set of the first control channel may be indicated by using the first control channel in a previous subframe; a third symbol in the first subframe is used to transmit a reference signal, where the reference signal is used to demodulate a second control channel and/or data; a time-frequency resource of the second control channel starts with a fourth symbol in the first subframe; a thirteenth symbol in the first subframe is used as a GP; and a fourteenth symbol in the first subframe is used for uplink transmission. In FIG. 11, because the resource in the extended set is dynamically indicated, forward compatibility can be better supported. For example, when some subframes in a subframe set 2 are dynamically used for future features, that no downlink control channel resource in the extended set exists in the subframes may be dynamically indicated to legacy user equipment, so that new features can be supported while the legacy user equipment can also be compatible.

Another implementation of this embodiment of the present disclosure may be a two-level control channel manner:

That a base station determines a time-frequency resource of a control channel, and that the base station transmits downlink control information based on the time-frequency resource of the control channel may specifically include:

the base station determines a time-frequency resource of a first control channel;

the base station determines a time-frequency resource of a second control channel;

the base station detects first downlink control information based on the time-frequency resource of the first control channel; and the base station detects second downlink control information based on the time-frequency resource of the second control channel.

Further optionally, a symbol occupied by the time-frequency resource of the first control channel is located before a symbol occupied by the time-frequency resource of the second control channel.

Further optionally, the time-frequency resource of the first control channel occupies i symbols, corresponding to symbols $l_0, \ldots, l_{i-1}$, where i is a positive integer greater than or equal to 1; the time-frequency resource of the second control channel starts with a symbol $l_{i+k}$, where k is a positive integer greater than or equal to 1; and a symbol $l_i$ to a symbol $l_{i+k-1}$ are used to transmit a reference signal, where the reference signal is used to demodulate the second control channel and/or data; or the time-frequency resource of the first control channel occupies i symbols, corresponding to symbols $l_0, \ldots, l_{i-1}$, where i is a positive integer greater than or equal to 1; the time-frequency resource of the second control channel starts with a symbol $l_i$, or the time-frequency resource of the second control channel is located on a symbol after the symbol $l_{i-1}$; and the second control channel and downlink data are multiplexed on a time-frequency resource corresponding to the symbol after the symbol $l_{i-1}$.

Herein the first control channel, the second control channel, and the reference signal used to demodulate the second control channel and/or data are placed ahead, so that detection can be performed quickly and that a latency can be reduced. Further, the reference signal used to demodulate the second control channel and/or data is placed after the first control channel and before the second control channel, so that the second control channel and data can be detected quickly. The second control channel and data are multiplexed, so that multiplexing efficiency can be improved and that spectrum efficiency is improved.

Optionally, that the base station determines a time-frequency resource of a first control channel, and that the base station determines a time-frequency resource of a second control channel include:

the base station determines a time-frequency resource of the first control channel in a first subframe; and the base station determines a time-frequency resource of the second control channel in the first subframe; where the first subframe includes a symbol used for downlink transmission, a guard period (GP), and a symbol used for uplink transmission, uplink transmission corresponding to a symbol included in the first subframe and used for uplink transmission includes hybrid automatic repeat request-acknowledgment (HARQ-ACK) transmission, and downlink transmission corresponding to a symbol included in the first subframe and used for downlink transmission includes downlink control transmission, downlink data transmission, and transmission of a first reference signal; and symbols included in the first subframe and used for downlink transmission include a symbol occupied by the time-frequency resource of the first control channel and a symbol occupied by the time-frequency resource of the second control channel.

Further optionally, the time-frequency resource of the first control channel occupies i symbols in the first subframe, corresponding to a first symbol to an $i^{th}$ symbol in the first subframe, where i is a positive integer greater than or equal to 1; the time-frequency resource of the second control channel starts with an $(i+k+1)^{th}$ symbol in the first subframe, where k is a positive integer greater than or equal to 1; an $(i+1)^{th}$ symbol to an $(i+k)^{th}$ symbol in the first subframe are used to transmit a reference signal, where the reference signal is used to demodulate the second control channel and/or data; and an $(1-k1)^{th}$ symbol to an $l^{th}$ symbol in the first subframe are symbols used for uplink transmission in the first subframe, where l is a quantity of symbols included in the first subframe, and k1 is a positive integer greater than or equal to 1; or the time-frequency resource of the first control channel occupies i symbols in the first subframe, corresponding to a first symbol to an $i^{th}$ symbol in the first subframe, where i is a positive integer greater than or equal to 1; the time-frequency resource of the second control channel starts with an $(i+1)^{th}$ symbol in the first subframe, or the time-frequency resource of the second control channel is located on a symbol after the $i^{th}$ symbol in the first subframe; the second control channel and downlink data are multiplexed on time-frequency resources corresponding to the $i^{th}$ symbol in the first subframe to an $(i+k2)^{th}$ symbol in the first subframe, where k2 is a positive integer greater than 1; an $(i+k2+1)^{th}$ symbol in the first subframe is a guard period GP in the first subframe; and an $(i+k2+2)^{th}$ symbol to an $l^{th}$ symbol in the first subframe are symbols used for uplink transmission in the first subframe, where l is a quantity of symbols included in the first subframe.

The first control channel, the second control channel, and the reference signal used to demodulate the second control channel and/or data are placed ahead in the first subframe, so that detection can be performed quickly and that a latency can be reduced. Further, the reference signal used to demodulate the second control channel and/or data is placed after the first control channel and before the second control channel in the first subframe, so that the second control channel and data can be detected quickly. The second control channel and data are multiplexed, so that multiplexing efficiency can be improved and that spectrum efficiency is improved. A design of the first subframe enables transmission of self-contained control and a pilot. To be specific, control corresponding to data of a current subframe may be fed back or transmitted in the current subframe, without depending on other subframes, so that the other subframes may be occupied by a future service anytime, that is, can better support forward compatibility.

Optionally, that the base station determines a time-frequency resource of a first control channel, and that the base station determines a time-frequency resource of a second control channel include:

the base station determines a time-frequency resource of the first control channel in a second subframe; and the base station determines that no time-frequency resource of the second control channel exists in the second subframe; where the second subframe includes a symbol used for downlink transmission, a guard period GP, and a symbol used for uplink transmission, downlink transmission corresponding to a symbol included in the second subframe and used for downlink transmission includes downlink control transmission, and uplink transmission corresponding to a symbol included in the second subframe and used for uplink transmission includes transmission of a second reference signal, uplink data transmission, and uplink control transmission.

Further, a symbol included in the second subframe and used for downlink transmission is a first symbol in the second subframe, and the time-frequency resource of the first control channel occupies the first symbol in the second subframe.

Herein the second subframe is mainly used for uplink data transmission, and includes the first control channel, and scheduling of self-contained uplink data is enabled. To be specific, uplink data transmission of the subframe is scheduled by using the first downlink control channel, so that transmission of self-contained control and a pilot is enabled. To be specific, control corresponding to data of a current subframe may be fed back or transmitted in the current subframe, without depending on other subframes, so that the other subframes may be occupied by a future service anytime, that is, can better support forward compatibility.

Further optionally, the base station detects the first downlink control information based on the time-frequency resource of the first control channel, where the first downlink control information includes information about the time-frequency resource of the second control channel.

Further, the first downlink control information is carried in a subframe n, and the second control channel is carried in the subframe n; or the first downlink control information is carried in a subframe n, and the second control channel is carried in a subframe n+k; where k is a positive integer greater than or equal to 1. For example, k is equal to 1, and n is a positive integer.

Because the time-frequency resource of the second control channel is indicated by using the first downlink control information, the control channel resource can dynamically change. Therefore, control channel resource can be set according to an actual requirement, fixed downlink resources are minimized, dynamic changes of uplink and downlink directions can be applied to more resources, and dynamic TDD can be better used. On the other hand, when a second control channel resource in a subframe n+k is indicated by using the first downlink control information in the subframe n, the second control channel resource is dynamically indicated, and therefore forward compatibility can be better supported. For example, when the subframe n+k is used for future features, downlink control signaling may be used to indicate to legacy user equipment that no second downlink control channel resource exists in the subframe, so that new features can be supported while the legacy user equipment can also be compatible.

Optionally, the method further includes:
the base station transmits a downlink shared channel; where
the first downlink control information includes information about the time-frequency resource of the second downlink control channel and/or information about a time-frequency resource of the downlink shared channel; and
the second downlink control information includes modulation and coding information of the downlink shared channel.

The second control channel resource is indicated by using the first control channel, and the first control information and the second control information jointly schedule the downlink shared channel. Therefore, a low-latency service can be scheduled in a short transmission time unit or a short transmission time interval, and control channel overheads in the short transmission time unit or the short transmission time interval can be reduced while the low-latency service is scheduled quickly.

Further optionally, the base station transmits a reference signal on the time-frequency resource of the first control channel, where the reference signal is used to demodulate the first control channel. The self-contained first control channel is enabled, so that demodulation of the first control channel does not depend on other resources. This helps support forward compatibility.

With reference to the descriptions of the first control channel implemented in the foregoing implementations, it can be known that, because the first control channel resource in the subframe set 1 is determined according to the preset rule, the control channel resource in the subframe set 1 is predefined or fixed, and the user equipment can detect a downlink control channel and complete access in a cell. In addition, in this embodiment of the present disclosure, because the time-frequency resource of the first control channel in the subframe set 2 is determined by using the downlink control signaling, the first control channel resource in the subframe set 2 can dynamically change. Therefore, control channel resources can be set according to an actual requirement, fixed downlink resources are minimized, dynamic changes of uplink and downlink directions can be applied to more resources, and dynamic TDD can be better used. On the other hand, because the first control channel resource in the subframe set 2 is indicated by using the downlink control signaling, forward compatibility can be better supported. For example, when some subframes in the subframe set 2 are dynamically used for future features, downlink control signaling may be used to indicate to legacy user equipment that no first downlink control channel resource exists in the subframes, so that new features can be supported while the legacy user equipment can also be compatible.

The time-frequency resource of the basic set of the first control channel is determined according to the preset rule, the downlink control information is detected based on the time-frequency resource of the basic set, and the time-frequency resource of the extended set of the first control channel is determined according to the detected downlink control information. Therefore, fixed downlink resources are minimized and used as time-frequency resources of the basic set, and dynamic TDD can be better used. On the other hand, because the resource in the extended set is dynamically indicated, forward compatibility can be better supported. For example, when some subframes in the subframe set 2 are dynamically used for future features, that no downlink control channel resource in the extended set exists in the subframes may be dynamically indicated to legacy user equipment, so that new features can be supported while the legacy user equipment can also be compatible.

Further, because the transmission mode of the extended set is indicated by using dynamic signaling, the transmission mode of the control channel can be better matched. For example, when the extended control channel is mainly used for common control signaling, the transmission mode of the extended set may be indicated as the distributed mode; or when the extended set signaling is mainly used for user equipment dedicated signaling, the localized transmission mode may be indicated, so that the transmission mode of the control channel is better matched.

Figure 12:
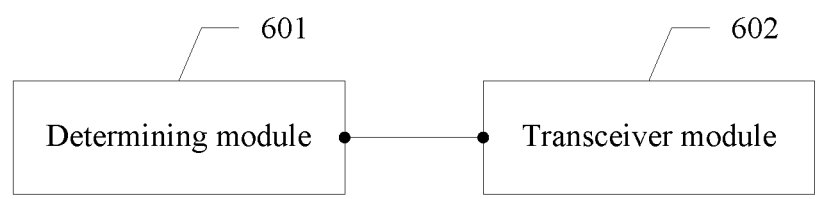
FIG. 12 is a schematic diagram of an embodiment of a device according to an embodiment of the present disclosure.

Referring to FIG. 12, a schematic diagram of an embodiment of a device in an embodiment of the present disclosure includes:

a determining module 601, configured to determine a location of a reference signal; and a transceiver module 602, configured to transmit or receive the reference signal based on the determined location of the reference signal.

In this embodiment, for explanations and descriptions about terms used in this embodiment, and detailed descriptions about the determining module 601 and the transceiver module 602, refer to the foregoing step 101, step 102, step 201 to step 204, and step 301 to step 304. Details are not described again herein.

Figure 13:
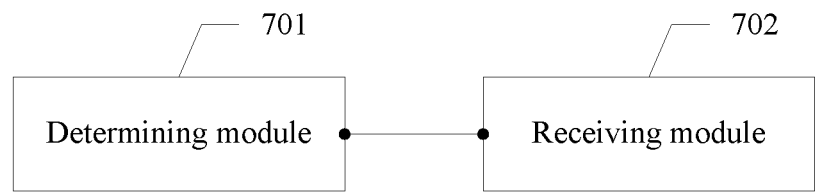
FIG. 13 is a schematic diagram of an embodiment of user equipment according to an embodiment of the present disclosure.

Referring to FIG. 13, a schematic diagram of an embodiment of user equipment in an embodiment of the present disclosure includes:

a determining module 701, configured to determine a time-frequency resource of a control channel; and a receiving module 702, configured to receive downlink control information based on the time-frequency resource of the control channel.

In this embodiment, for detailed descriptions about the determining module 701 and the transceiver module 702, refer to the foregoing step 401 and step 402. Details are not described again herein.

Figure 14:
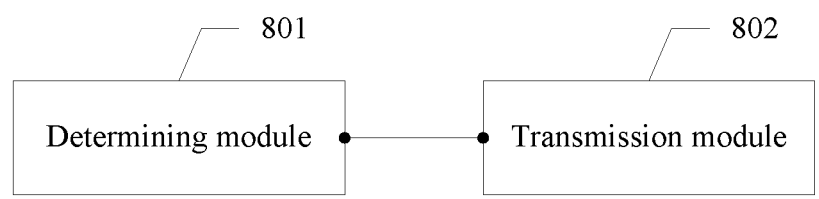
FIG. 14 is a schematic diagram of an embodiment of a base station according to an embodiment of the present disclosure.

Referring to FIG. 14, a schematic diagram of an embodiment of a base station in an embodiment of the present disclosure includes:

a determining module 801, configured to determine a time-frequency resource of a control channel; and a transmission module 802, configured to transmit downlink control information based on the time-frequency resource of the control channel.

In this embodiment, for detailed descriptions about the determining module 801 and the transmission module 802, refer to the foregoing step 501 and step 502. Details are not described again herein.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for transmitting and receiving information, comprising:

determining, by a first device, a location of a reference signal; and transmitting or receiving, by the first device, the reference signal based on the determined location of the reference signal, wherein the reference signal comprises a first reference signal and a second reference signal, and the determining, by the first device, the location of the reference signal comprises:

determining, by the first device, a location of the first reference signal, wherein the first reference signal is used for downlink data demodulation; and determining, by the first device, a location of the second reference signal, wherein the second reference signal is used for uplink data demodulation;

wherein a time domain location of the first reference signal is the same as that of the second reference signal, wherein the first reference signal is carried in a first subframe, the location of the first reference signal is a location of the first reference signal in the first subframe, the second reference signal is carried in a second subframe, the location of the second reference signal is a location of the second reference signal in the second subframe, that the time domain location of the first reference signal is the same as the time domain location of the second reference signal is that a time domain location of the first reference signal in the first subframe is the same as a time domain location of the second reference signal in the second subframe, a quantity of symbols used for downlink transmission in the first subframe is greater than a quantity of symbols used for uplink transmission in the first subframe, and a quantity of symbols used for downlink transmission in the second subframe is less than a quantity of symbols used for uplink transmission in the second subframe.

2. The method according to claim 1, wherein the first subframe comprises one or more symbols used for downlink transmission, a guard period (GP), and one or more symbols used for uplink transmission, uplink transmission corresponding to the one or more symbols comprised in the first subframe and used for uplink transmission comprises hybrid automatic repeat request-acknowledgment (HARQ-ACK) transmission, and downlink transmission corresponding to the one or more symbols comprised in the first subframe and used for downlink transmission comprises downlink control transmission, downlink data transmission, and transmission of the first reference signal; and the second subframe comprises one or more symbols used for downlink transmission, a guard period (GP), and one or more symbols used for uplink transmission, downlink transmission corresponding to the one or more symbols comprised in the second subframe and used for downlink transmission comprises downlink control transmission, and uplink transmission corresponding to the one or more symbols comprised in the second subframe and used for uplink transmission comprises uplink control transmission, uplink data transmission, and transmission of the second reference signal.

3. The method according to claim 1, wherein the first subframe starts with a symbol comprised in the first subframe and used for downlink transmission, and ends with a symbol comprised in the first subframe and used for uplink transmission; and the second subframe starts with a symbol comprised in the second subframe and used for downlink transmission, and ends with a symbol comprised in the second subframe and used for uplink transmission.

4. The method according to claim 1, wherein that a time domain location of the first reference signal in the first subframe is the same as a time domain location of the second reference signal in the second subframe is that an index of a symbol occupied by the first reference signal in the first subframe is the same as an index of a symbol occupied by the second reference signal in the second subframe.

5. The method according to claim 1, wherein the first reference signal is located on a third symbol in the first subframe, and the second reference signal is located on a third symbol in the second subframe.

6. An apparatus, comprising:
one or more processors, and
a non-transitory storage medium configured to store program instructions;
wherein, when the program instructions are executed by the one or more processors, the instructions cause the apparatus to perform a method that comprises:
determining a location of a reference signal; and
transmitting or receiving the reference signal based on the determined location of the reference signal,
wherein the reference signal comprises a first reference signal and a second reference signal, and the determining the location of the reference signal comprises:
determining a location of the first reference signal, wherein the first reference signal is used for downlink data demodulation; and
determining a location of the second reference signal, wherein the second reference signal is used for uplink data demodulation;
wherein a time domain location of the first reference signal is the same as that of the second reference signal, wherein the first reference signal is carried in a first subframe, the location of the first reference signal is a location of the first reference signal in the first subframe, the second reference signal is carried in a second subframe, the location of the second reference signal is a location of the second reference signal in the second subframe, that a time domain location of the first reference signal is the same as a time domain location of the second reference signal is that a time domain location of the first reference signal in the first subframe is the same as a time domain location of the second reference signal in the second subframe, a quantity of symbols used for downlink transmission in the first subframe is greater than a quantity of symbols used for uplink transmission in the first subframe, and a quantity of symbols used for downlink transmission in the second subframe is less than a quantity of symbols used for uplink transmission in the second subframe.

7. The apparatus according to claim 6, wherein the first subframe comprises one or more symbols used for downlink transmission, a guard period (GP), and one or more symbols used for uplink transmission, uplink transmission corresponding to the one or more symbols comprised in the first subframe and used for uplink transmission comprises hybrid automatic repeat request-acknowledgment (HARQ-ACK) transmission, and downlink transmission corresponding to the one or more symbols comprised in the first subframe and used for downlink transmission comprises downlink control transmission, downlink data transmission, and transmission of the first reference signal; and the second subframe comprises one or more symbols used for downlink transmission, a guard period (GP), and one or more symbols used for uplink transmission, downlink transmission corresponding to the one or more symbols comprised in the second subframe and used for downlink transmission comprises downlink control transmission, and uplink transmission corresponding to the one or more symbols comprised in the second subframe and used for uplink transmission comprises uplink control transmission, uplink data transmission, and transmission of the second reference signal.

8. The apparatus according to claim 6, wherein the first subframe starts with a symbol comprised in the first subframe and used for downlink transmission, and ends with a symbol comprised in the first subframe and used for uplink transmission; and the second subframe starts with a symbol comprised in the second subframe and used for downlink transmission, and ends with a symbol comprised in the second subframe and used for uplink transmission.

9. The apparatus according to claim 6, wherein that a time domain location of the first reference signal in the first subframe is the same as a time domain location of the second reference signal in the second subframe is that an index of a symbol occupied by the first reference signal in the first subframe is the same as an index of a symbol occupied by the second reference signal in the second subframe.

10. The apparatus according to claim 6, wherein the first reference signal is located on a third symbol in the first subframe, and the second reference signal is located on a third symbol in the second subframe.

11. The apparatus according to claim 6, wherein the apparatus is applied to user equipment, and the transmitting or receiving step comprises: receiving the first reference signal based on the location of the first reference signal, and transmitting the second reference signal based on the location of the second reference signal.

12. The apparatus according to claim 6, wherein the apparatus is applied to a base station, and the transmitting or receiving step comprises: transmitting the first reference signal based on the location of the first reference signal, and receiving the second reference signal based on the location of the second reference signal.

13. A non-transitory computer readable medium storing program codes for use by an apparatus for transmitting and receiving information, wherein the program codes comprise instructions for:
   determining a location of a reference signal; and
   transmitting or receiving the reference signal based on the determined location of the reference signal,
   wherein the reference signal comprises a first reference signal and a second reference signal, and the determining the location of the reference signal comprises:
   determining location of the first reference signal, wherein the first reference signal is used for downlink data demodulation; and
   determining a location of the second reference signal, wherein the second reference signal is used for uplink data demodulation;
   wherein a time domain location of the first reference signal is the same as that of the second reference signal,
   wherein the first reference signal is carried in a first subframe, the location of the first reference signal is a location of the first reference signal in the first subframe, the second reference signal is carried in a second subframe, the location of the second reference signal is a location of the second reference signal in the second subframe, that the time domain location of the first reference signal is the same as the time domain location of the second reference signal is that a time domain location of the first reference signal in the first subframe is the same as a time domain location of the second reference signal in the second subframe, a quantity of symbols used for downlink transmission in the first subframe is greater than a quantity of symbols used for uplink transmission in the first subframe, and a quantity of symbols used for downlink transmission in the second subframe is less than a quantity of symbols used for uplink transmission in the second subframe.

14. The non-transitory computer readable medium according to claim 13, wherein the first subframe comprises one or more symbols used for downlink transmission, a guard period (GP), and one or more symbols used for uplink transmission, uplink transmission corresponding to the one or more symbols comprised in the first subframe and used for uplink transmission comprises hybrid automatic repeat request-acknowledgment (HARQ-ACK) transmission, and downlink transmission corresponding to the one or more symbols comprised in the first subframe and used for downlink transmission comprises downlink control transmission, downlink data transmission, and transmission of the first reference signal; and the second subframe comprises one or more symbols used for downlink transmission, a guard period (GP), and one or more symbols used for uplink transmission, downlink transmission corresponding to the one or more symbols comprised in the second subframe and used for downlink transmission comprises downlink control transmission, and uplink transmission corresponding to the one or more symbols comprised in the second subframe and used for uplink transmission comprises uplink control transmission, uplink data transmission, and transmission of the second reference signal.

* * * * *

UNITED STATES PATENT AND TRADEMARK OFFICE
CERTIFICATE OF CORRECTION

| | | |
|---|---|---|
| PATENT NO. | : 11,283,564 B2 | Page 1 of 1 |
| APPLICATION NO. | : 16/185916 | |
| DATED | : March 22, 2022 | |
| INVENTOR(S) | : Cheng et al. | |

It is certified that error appears in the above-identified patent and that said Letters Patent is hereby corrected as shown below:

On the Title Page

Applicant (71): "Huawei Technologies Co., Ltd., Guangdong (CN)" should read -- Huawei Technologies Co., Ltd., Shenzhen (CN) --.

Signed and Sealed this
Fifth Day of July, 2022

Katherine Kelly Vidal
*Director of the United States Patent and Trademark Office*